United States Patent
Beaumont et al.

(10) Patent No.: US 9,092,691 B1
(45) Date of Patent: Jul. 28, 2015

(54) SYSTEM FOR COMPUTING QUANTITATIVE BIOMARKERS OF TEXTURE FEATURES IN TOMOGRAPHIC IMAGES

(71) Applicants: Hubert Beaumont, Roquefort les Pins (FR); Nicolas Dano, Saint Vallier de Thiey (FR); Colette Charbonnier, Nice (FR); Sebastien Grosset, Grasse (FR); Michael Auffret, Valbonne (FR); Arnaud Butzbach, Biot (FR); Slimane Oubaiche, Valbonne (FR)

(72) Inventors: Hubert Beaumont, Roquefort les Pins (FR); Nicolas Dano, Saint Vallier de Thiey (FR); Colette Charbonnier, Nice (FR); Sebastien Grosset, Grasse (FR); Michael Auffret, Valbonne (FR); Arnaud Butzbach, Biot (FR); Slimane Oubaiche, Valbonne (FR)

(73) Assignee: MEDIAN TECHNOLOGIES, Valbonne (FR)

( * ) Notice: Subject to any disclaimer, the term of this patent is extended or adjusted under 35 U.S.C. 154(b) by 0 days.

(21) Appl. No.: 14/606,026

(22) Filed: Jan. 27, 2015

Related U.S. Application Data

(60) Provisional application No. 62/026,041, filed on Jul. 18, 2014.

(51) Int. Cl.
*G06K 9/00* (2006.01)
*G06K 9/46* (2006.01)
(Continued)

(52) U.S. Cl.
CPC .. *G06K 9/46* (2013.01); *G06K 9/48* (2013.01); *G06T 7/0012* (2013.01); *G06T 7/40* (2013.01); *G06K 2009/4666* (2013.01); *G06T 2207/10072* (2013.01)

(58) Field of Classification Search
USPC ......... 382/100, 103, 106–108, 128–134, 154, 382/162, 168, 173, 181, 199, 203, 224, 232, 382/254, 266, 274, 276, 286–295, 305, 382/312; 345/589; 600/317; 424/9.1; 435/6.14; 703/11
See application file for complete search history.

(56) References Cited

U.S. PATENT DOCUMENTS

| | | | |
|---|---|---|---|
| 5,359,513 A | 10/1994 | Kano et al. | |
| 5,989,811 A * | 11/1999 | Veltri et al. | 435/6.14 |

(Continued)

OTHER PUBLICATIONS

A. Afifi and T. Nakaguchi, "Liver Segmentation Approach Using Graph Cuts and Iteratively Estimated Shape and Intensity Constrains," in Medical Image Computing and Computer-Assisted Intervention—MICCAI 2012, N. Ayache, H. Delingette, P. Golland, and K. Mori, Eds. Springer Berlin Heidelberg, 2012, pp. 395-403.

(Continued)

*Primary Examiner* — Seyed Azarian
(74) *Attorney, Agent, or Firm* — Johan O. Brag; Innova Law, LLC

(57) ABSTRACT

An image processing apparatus for computing a quantitative imaging biomarker (QIB) of disease severity from variations in texture-based features in a tomographic image, the apparatus including a first preprocessing module for normalizing the intensities in the tomographic image; a second identification module for identifying at least one organ of interest in the tomographic image; a third ROI selection module for identifying and selecting a plurality of target ROIs and reference ROIs representative respectively of abnormal and normal pathology in the organ(s) of interest; a fourth ROI assessment module for extracting a plurality of texture-based feature signatures from the target ROIs and the reference ROIs, wherein the feature signatures are generated from distributions of statistical attributes extracted from each ROI; a fifth biomarker assessment module for computing the distance between the target ROI signatures and the reference ROI signatures, wherein the biomarker of disease severity is a function of the distances between the target ROI signatures and the reference ROI signatures.

15 Claims, 16 Drawing Sheets

(51) Int. Cl.
    *G06T 7/00*     (2006.01)
    *G06T 7/40*     (2006.01)
    *G06K 9/48*     (2006.01)
    *C12Q 1/68*     (2006.01)

(56) References Cited

U.S. PATENT DOCUMENTS

| | | | |
|---|---|---|---|
| 7,492,931 | B2 | 2/2009 | Sabol et al. |
| 7,885,438 | B2 | 2/2011 | Uppaluri et al. |
| 8,229,189 | B2 | 7/2012 | Seghers et al. |
| 8,265,728 | B2 | 9/2012 | MacMahon et al. |
| 8,369,595 | B1 | 2/2013 | Derakhshani et al. |
| 8,498,492 | B2 | 7/2013 | Declerck et al. |
| 8,527,250 | B2 * | 9/2013 | Graf et al. .............. 703/11 |
| 2009/0068108 | A1 * | 3/2009 | Sokolov et al. ............. 424/9.1 |
| 2010/0142775 | A1 | 6/2010 | Ganeshan et al. |
| 2011/0306857 | A1 * | 12/2011 | Razansky et al. ........... 600/317 |
| 2012/0136255 | A1 | 5/2012 | Fan et al. |
| 2013/0208963 | A1 | 8/2013 | Leal et al. |
| 2014/0375671 | A1 * | 12/2014 | Giger et al. ............. 345/589 |

OTHER PUBLICATIONS

B. Aicha and B. Abdelhafid, "Morphological Segmentation of the Spleen From Abdominal CT Images," International Journal of Image, Graphics and Signal Processing, vol. 4, No. 4, pp. 56-62, May 2012.

M. Amadasun and R. King, "Textural features corresponding to textural properties," IEEE Transactions on Systems, Man and Cybernetics, vol. 19, No. 5, pp. 1264-1273, 1989.

G. Baudat and F. Anouar, "Generalized Discriminant Analysis Using a Kernel Approach," Neural Computation, vol. 12, No. 10, pp. 2385-2404, Oct. 2000.

P. S. Calhoun, B. S. Kuszyk, D. G. Heath, J. C. Carley, and E. K. Fishman, "Three-dimensional Volume Rendering of Spiral CT Data: Theory and Method," RadioGraphics, vol. 19, No. 3, pp. 745-764, May 1999.

P. Campadelli, E. Casiraghi, S. Pratissoli, and G. Lombardi, "Automatic abdominal organ segmentation from CT images," Electronic Letters on Computer Vision and Image Analysis, vol. 8, No. 1, pp. 1-14, 2009.

S. Chen, K. Suzuki, and H. MacMahon, "Development and evaluation of a computer-aided diagnostic scheme for lung nodule detection in chest radiographs by means of two-stage nodule enhancement with support vector classification," Medical Physics, vol. 38, No. 4, pp. 1844-1858, Mar. 2011.

H. Choi, C. Chamsangavej, S. C. Faria, H. A. Macapinlac, M. A. Burgess, S. R. Patel, L. L. Chen, D. A. Podoloff, and R. S. Benjamin, "Correlation of Computed Tomography and Positron Emission Tomography in Patients With Metastatic Gastrointestinal Stromal Tumor Treated at a Single Institution With Imatinib Mesylate: Proposal of New Computed Tomography Response Criteria," JCO, vol. 25, No. 13, pp. 1753-1759, May 2007.

R. H. Choplin, K. A. Buckwalter, J. Rydberg, and J. M. Farber, "CT with 3D Rendering of the Tendons of the Foot and Ankle: Technique, Normal Anatomy, and Disease," RadioGraphics, vol. 24, No. 2, pp. 343-356, Mar. 2004.

C. M. Costelloe, H. H. Chuang, J. E. Madewell, and N. T. Ueno, "Cancer response criteria and bone metastases: RECIST 1.1, MDA and PERCIST," Journal of Cancer, vol. 1, p. 80, 2010.

R. Cuingnet, R. Prevost, D. Lesage, L. D. Cohen, B. Mory, and R. Ardon, "Automatic Detection and Segmentation of Kidneys in 3D CT Images Using Random Forests," in Medical Image Computing and Computer-Assisted Intervention—MICCAI 2012, N. Ayache, H. Delingette, P. Golland, and K. Mori, Eds. Springer Berlin Heidelberg, 2012, pp. 66-74.

F. Davnall, C. S. P. Yip, G. Ljungqvist, M. Selmi, F. Ng, B. Sanghera, B. Ganeshan, K. A. Miles, G. J. Cook, and V. Goh, "Assessment of tumor heterogeneity: an emerging imaging tool for clinical practice?," Insights Imaging, vol. 3, No. 6, pp. 573-589, Dec. 2012.

A. Depeursinge, A. Foncubierta-Rodriguez, D. Van De Ville, and H. Müller, "Three-dimensional solid texture analysis in biomedical imaging: Review and opportunities," Medical Image Analysis, vol. 18, No. 1, pp. 176-196, Jan. 2014.

K. Doi, "Computer-aided diagnosis in medical imaging: Historical review, current status and future potential," Computerized Medical Imaging and Graphics, vol. 31, No. 4-5, pp. 198-211, Jun. 2007.

K. Dučinskas and Šaltytė, J., "Quadratic Discriminant Analysis of Spatially Correlated Data," Nonlinear Analysis: Modelling and Control, vol. 6, No. 2, pp. 15-28, 2001.

J. Edeline, E. Boucher, Y. Rolland, E. Vauléon, M. Pracht, C. Perrin, C. Le Roux, and J.-L. Raoul, "Comparison of tumor response by Response Evaluation Criteria in Solid Tumors (RECIST) and modified RECIST in patients treated with sorafenib for hepatocellular carcinoma," Cancer, vol. 118, No. 1, pp. 147-156, 2012.

I. El Naqa, P. Grigsby, A. Apte, E. Kidd, E. Donnelly, D. Khullar, S. Chaudhari, D. Yang, M. Schmitt, R. Laforest, W. Thorstad, and J. O. Deasy, "Exploring feature-based approaches in PET images for predicting cancer treatment outcomes," Pattern Recognit, vol. 42, No. 6, pp. 1162-1171, Jun. 2009.

M. A. T. Figueiredo, "Bayesian Image Segmentation Using Gaussian Field Priors," in Energy Minimization Methods in Computer Vision and Pattern Recognition, A. Rangarajan, B. Vemuri, and A. L. Yuille, Eds. Springer Berlin Heidelberg, 2005, pp. 74-89.

M. M. Galloway, "Texture analysis using gray-level run lengths", Computer Graphics and Image Processing, vol. 4, pp. 172-179, Jun. 1975.

M. L. Giger, K. Doi, and H. MacMahon, "Image feature analysis and computer-aided diagnosis in digital radiography. 3. Automated detection of nodules in peripheral lung fields," Medical Physics, vol. 15, No. 2, pp. 158-166, Mar. 1988.

L. W. Goldman, "Principles of CT and CT Technology," Journal of Nuclear Medicine Technology, vol. 35, No. 3, pp. 115-128, Sep. 2007.

R. M. Haralick, K. Shanmugam, and I. Dinstein, "Textural Features for Image Classification," IEEE Transactions on Systems, Man and Cybernetics, vol. SMC-3, No. 6, pp. 610-621,1973.

M. Hasegawa, S. Sone, S. Takashima, F. Li, Z. G. Yang, Y. Maruyama, and T. Watanabe, "Growth rate of small lung cancers detected on mass CT screening.," Br J Radiol, vol. 73, No. 876, pp. 1252-1259, Dec. 2000.

M. S. Hassouna, A. A. Farag, and R. Falk, "Virtual Fly-Over: A New Visualization Technique for Virtual Colonoscopy," in Medical Image Computing and Computer-Assisted Intervention—MICCAI 2006, R. Larsen, M. Nielsen, and J. Sporring, Eds. Springer Berlin Heidelberg, 2006, pp. 381-388.

J. Keun Jo, K. Dae Cheol, L. Jong-Woong, C. Jiwon, G. Eun-hoe, D. Kyung-Rae, L. Jae-Seung, and J. Gye Hwan, "Measurement of Image Quality in CT Images Reconstructed with Different Kernels," Journal of the Korean Physical Society, vol. 58, No. 2, p. 334, Feb. 2011.

S. Kullback, "An Application of Information Theory to Multivariate Analysis," Ann. Math. Statist., vol. 23, No. 1, pp. 88-102, Mar. 1952.

T. Lindeberg, "Scale-space behaviour of local extrema and blobs," J Math Imaging Vis, vol. 1, No. 1, pp. 65-99, Mar. 1992.

M. G. Linguraru, S. Wang, F. Shah, R. Gautam, J. Peterson, W. M. Linehan, and R. M. Summers, "Computer-aided renal cancer quantification and classification from contrast-enhanced CT via histograms of curvature-related features," in Annual International Conference of the IEEE Engineering in Medicine and Biology Society, 2009. EMBC 2009, 2009, pp. 6679-6682.

M. F. McNitt-Gray, E. M. Hart, N. Wyckoff, J. W. Sayre, J. G. Goldin, and D. R. Aberle, "A pattern classification approach to characterizing solitary pulmonary nodules imaged on high resolution CT: preliminary results," Med Phys, vol. 26, No. 6, pp. 880-888, Jun. 1999.

A. Militzer, T. Hager, F. Jäger, C. Tietjen, and J. Hornegger, "Automatic Detection and Segmentation of Focal Liver Lesions in Contrast Enhanced CT Images," in 2010 20th International Conference on Pattern Recognition (ICPR), 2010, pp. 2524-2527.

I. Nwogu and J. J. Corso, "Exploratory Identification of Image-Based Biomarkers for Solid Mass Pulmonary Tumors," in Medical Image Computing and Computer-Assisted Intervention—MICCAI 2008, D. Metaxas, L. Axel, G. Fichtinger, and G. Székely, Eds. Springer Berlin Heidelberg, 2008, pp. 612-619.

(56) References Cited

OTHER PUBLICATIONS

J. P. W. Pluim, J. B. A. Maintz, and M. A. Viergever, "Mutual-information-based registration of medical images: a survey," IEEE Transactions on Medical Imaging, vol. 22, No. 8, pp. 986-1004, 2003.

C. A. Ridge, J. Huang, S. Cardoza, E. C. Zabor, C. S. Moskowitz, M. F. Zakowski, and M. S. Ginsberg, "Comparison of Multiplanar Reformatted CT Lung Tumor Measurements to Axial Tumor Measurement Alone: Impact on Maximal Tumor Dimension and T Stage," American Journal of Roentgenology, vol. 201, No. 5, pp. 959-963, Nov. 2013.

Y. Rubner, C. Tomasi, and L. J. Guibas, "The Earth Mover's Distance as a Metric for Image Retrieval," International Journal of Computer Vision, vol. 40, No. 2, pp. 99-121, Nov. 2000.

H. Tamura, S. Mori, and T. Yamawaki, "Textural Features Corresponding to Visual Perception," IEEE Transactions on Systems, Man and Cybernetics, vol. 8, No. 6, pp. 460-473, 1978.

F. Tixier, M. Hatt, C. C. L. Rest, A. L. Pogam, L. Corcos, and D. Visvikis, "Reproducibility of Tumor Uptake Heterogeneity Characterization Through Textural Feature Analysis in 18F-FDG PET," J Nucl Med, vol. 53, No. 5, pp. 693-700, May 2012.

F. Tixier, C. C. L. Rest, M. Hatt, N. Albarghach, O. Pradier, J.-P. Metges, L. Corcos, and D. Visvikis, "Intratumor Heterogeneity Characterized by Textural Features on Baseline 18F-FDG PET Images Predicts Response to Concomitant Radiochemotherapy in Esophageal Cancer," J Nucl Med, vol. 52, No. 3, pp. 369-378, Mar. 2011.

T. Vik, D. Bystrov, N. Schadewaldt, H. Schulz, and J. Peters, "A new method for robust organ positioning in CT images," in 2012 9th IEEE International Symposium on Biomedical Imaging (ISBI), 2012, pp. 338-341.

R. L. Wahl, H. Jacene, Y. Kasamon, and M. A. Lodge, "From RECIST to PERCIST: Evolving Considerations for PET Response Criteria in Solid Tumors," J Nucl Med, vol. 50, No. Suppl 1, p. 122S-150S, May 2009.

S. Wang, J. Yao, N. Petrick, and R. M. Summers, "Combining Statistical and Geometric Features for Colonic Polyp Detection in CTC Based on Multiple Kernel Learning," Int J Comput Intell Appl, vol. 9, No. 1, pp. 1-15, Jan. 2010.

H. Z. Yang Yu, "Enhancement Filter for Computer-Aided Detection of Pulmonary Nodules on Thoracic CT images," Intelligent Systems Design and Applications, International Conference on, vol. 2, pp. 1200-1205, 2006.

J.-W. Zhang, X.-Y. Feng, H.-Q. Liu, Z.-W. Yao, Y.-M. Yang, B. Liu, and Y.-Q. Yu, "CT volume measurement for prognostic evaluation of unresectable hepatocellular carcinoma after TACE," World J Gastroenterol, vol. 16, No. 16, pp. 2038-2045, Apr. 2010.

Y. Zheng, X. Cui, M. P. Wachowiak, and A. S. Elmaghraby, "CT scout z-resolution improvement with image restoration methods," 2003, vol. 5032, pp. 1851-1857.

X. Zhou, S. Yamaguchi, X. Zhou, H. Chen, T. Hara, R. Yokoyama, M. Kanematsu, and H. Fujita, "Automatic organ localizations on 3D CT images by using majority-voting of multiple 2D detections based on local binary patterns and Haar-like features," 2013, vol. 8670, p. 86703A 1-7.

H. Choi, C. Charnsangavej, S. C. Faria, H. A. Macapinlac, M. A. Burgess, S. R. Patel, L. L. Chen, D. A. Podoloff, and R. S. Benjamin, "Correlation of Computed Tomography and Positron Emission Tomography in Patients With Metastatic Gastrointestinal Stromal Tumor Treated at a Single Institution With Imatinib Mesylate: Proposal of New Computed Tomography Response Criteria," JCO, vol. 25, No. 13, pp. 1753-1759, May 2007.

R. M. Haralick, K. Shanmugam, and I. Dinstein, "Textural Features for Image Classification," IEEE Transactions on Systems, Man and Cybernetics, vol. SMC-3, No. 6, pp. 610-621, 1973.

C. A. Ridge, J. Huang, S. Cardoza, E. C. Zabor, C. S. Moskowitz, M. F. Zakowski, and M. S. Ginsberg, "Comparison of Multiplanar Refomiatted CT Lung Tumor Measurements to Axial Tumor Measurement Alone: Impact on Maximal Tumor Dimension and T Stage," American Journal of Roentgenology, vol. 201, No. 5, pp. 959-963, Nov. 2013.

Y. Zheng, X. Cul, M. P. Wachowiak, and A. S. Elmaghraby, "CT scout z-resolution improvement with image restoration methods," 2003, vol. 5032, pp. 1851-1857.

\* cited by examiner

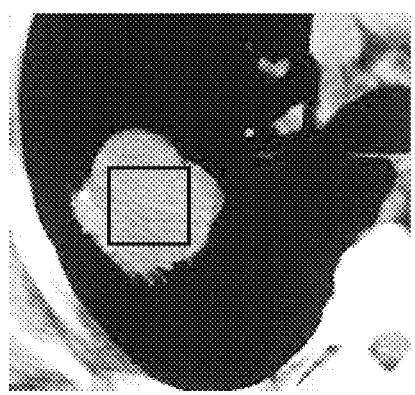
Fig..23
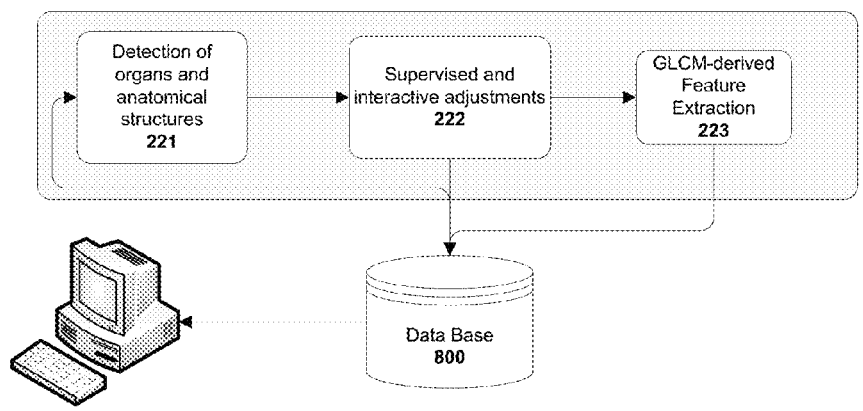
Fig. 24

SYSTEM FOR COMPUTING QUANTITATIVE BIOMARKERS OF TEXTURE FEATURES IN TOMOGRAPHIC IMAGES

PRIOR APPLICATION

This application claims benefit of provisional U.S. patent application 62/026,041.

TECHNICAL FIELD

This disclosure relates to texture-based quantitative imaging biomarkers of disease progression and response to therapy.

BACKGROUND

Cancer remains the leading cause of death in the world despite improvements in early diagnosis and therapy. The development of new classes of drugs and the growing insight into the cellular processes involved in malignant growth has led to renewed enthusiasm to treat various forms of cancer. The absence of clear results is in part due to the fact that no validated biological markers (or biomarkers) currently exist for measuring and predicting the effect of therapy.

Tumor response as measured by anatomic imaging, which was used to measure therapeutic efficacy in the era of cytotoxic drugs, has been a valuable tool in validating clinical trials. Advanced imaging technologies, including both metabolic and molecular imaging platforms, are becoming important partners in evaluating response as a clinically meaningful study endpoint. Tumor response is typically determined by measurements of changes in tumor burden, most often obtained from computed tomography (CT) or magnetic resonance imaging (MRI). The tumor burden size is most often computed based on morphological features such as the longest axial diameter in one-dimensional Response Evaluation Criteria in Solid Tumors (RECIST) or the two-dimensional World Health Organization (WHO) criterion which are commonly used for assessing response to treatment, to define clinical trial endpoints, and are useful in studies evaluating cytotoxic drugs in which tumor shrinkage is expected. Together with the developing of cytostatic drugs resulting in little or no tumor shrinkage, there is a need for biomarkers of response which do not depend on morphological features.

Attempts have been at improving the measure of response criteria by incorporating intensity related features such as tumor density and size into a single index. An improved response evaluation criterion was defined as a greater than 10% decrease in tumor size or a greater than 15% decrease in tumor density. The problem with such methods is that rely on prior identification and segmentation of lesions which is highly process and operator dependent. The accuracy of quantitative biomarker assessment is limited by the accuracy of the segmentation method used to define the lesions of interest. There is therefore a need for biomarker assessment methods which do not depend on segmentation of lesions.

Furthermore, registration and delineation of lesions are generally performed based on 2D slices limiting the spatial relationship measures between the pixels in a tumor, hence the texture and size feature measurements are not as accurate as they would be in a 3D model. Therefore, there is a need for quantitative methods of imaging biomarker computation able to overcome the limitations of current 2D image processing techniques.

Three-dimensional solid texture analysis has been widely applied in various fields of imaging. U.S. Pat. No. 8,457,414 to Jahanbin et al. discloses a method for detecting textural defects in an image using second-order statistical attributes extracted from a GLCM.

Texture analysis is also a promising field in biomedical imaging. It is found that most of the tissue types have strong multi-scale directional properties that are well captured by imaging protocols with high resolutions and spherical spatial transfer functions. (Depeursinge, 2013). Texture in medical images is defined as cellularly organized areas of pixels. Such patterns can be described by a given spatial organization of grey levels (e.g., random, periodic). Early examples of texture features are the autocorrelation function, textural edginess, measurements derived from mathematical morphology, run-length and gray-level co-occurrence matrices (GLCMs).

The majority of papers describing computer-aided diagnosis for lung diseases use texture features to classify lung tissue patterns. Aisen et al. describe a content-based image retrieval system in which the physician delineates a suspicious region of interest (ROI). The system then matches the ROI against reference ROIs in images that are already indexed in the database through co-occurrence matrices, grey-level distributions and size of the ROI. Markel et al., proposes the use of 3D texture features for automated segmentation of lung carcinoma While most existing cancer biomarkers have been limited to measures of morphological changes, many of the new treatments do not translate into measurable changes in size of tumors. There is therefore a need for novel quantitative biomarkers of disease progression which can measure changes in texture over a period of time.

Additionally, current imaging biomarkers typically requires the segmentation of ROIs. Image segmentation is often subjective and lacks repeatability resulting in reduced accuracy of the biomarkers. There is therefore a need for biomarkers which can be computed without the need for prior image segmentation.

SUMMARY

Systems and methods are disclosed for computing quantitative imaging biomarkers (QIBs) of disease severity and progression using texture-based features extracted from tomographic images without the use of segmentation. Segmentation is not only unnecessary for QIBs, but is highly operator dependent and also reduces precision. Because of variations of appearance both within the same texture and across different textures in an image, both individual textures and multi-textured images are best described by distributions of descriptors, rather than by individual descriptors. We have disclosed an effective implementation of texture-based QIBs by replacing image segmentation with clustering of similar texture descriptors into compact, but detailed and versatile texture signatures. The Earth Movers Distance, together with an appropriate ground distance, has proven an effective metric in computing QIBs of disease severity and progression for a variety of conditions including lung and liver cancer, heart disease and bone disorders.

One object of the method is to compute quantitative imaging biomarkers (QIBs) of disease severity and progression derived from texture-based features extracted from regions of interest in tomographic images without the need for prior segmentation of the regions of interest.

A further aspect of the method is compute quantitative imaging biomarkers (QIBs) of response to therapy.

Still another aspect of the system is to identify and track ROIs present in temporal image sequences of the same patient and compute the distance between feature signatures generated from the ROIs over time as a biomarker of progression of disease.

Still another aspect of the system is to provide imaging biomarkers sensitive enough to capture small variations in disease states.

In a first embodiment, an image processing apparatus for computing a quantitative imaging biomarker (QIB) of disease severity from variations in texture-based features in a tomographic image, the apparatus comprising a first preprocessing module for normalizing the intensities in the tomographic image; a second identification module for identifying at least one organ of interest in the tomographic image; a third ROI selection module for identifying and selecting a plurality of target ROIs and reference ROIs representative respectively of abnormal and normal pathology in the organ(s) of interest; a fourth ROI assessment module for extracting a plurality of texture-based feature signatures from the target ROIs and the reference ROIs, wherein the feature signatures are generated from distributions of statistical attributes extracted from each ROI; a fifth biomarker assessment module for computing the distance between the target ROI signatures and the reference ROI signatures, wherein the QIB is a function of the distances between the target ROI signatures and the reference ROI signatures.

In examples of a first embodiment of the disclosure, the tomographic images are selected from the group consisting of computer tomography, magnetic resonance imaging, single photon computed emission tomography and positron emission tomography.

In another example of a first embodiment, the texture-based feature signatures are generated from a plurality of distributions of normalized statistical attributes extracted from each ROI.

In yet another example of a first embodiment, the statistical attributes are second order statistical attributes.

In still another example of a first embodiment, the second order statistical attributes are selected from the group consisting of Energy, Contrast, Correlation, Sum of Square Variance, Homogeneity, Sum Average, Sum Variance, Sum Entropy, Entropy, Difference Variance, Difference Entropy, Info Measure of Correlation, Maximal Correlation Coefficient.

In yet another example of a first embodiment, the distance is selected from the group consisting of (Earth Movers Distance, Divergence of Kullback-Leibler).

In a second embodiment of the system, an image processing apparatus for computing a QIB of disease progression from a temporal tomographic image sequence, the apparatus comprising a first module for identifying at least one common ROI in each image of the temporal sequence; a second module for performing a voxel by voxel registration of the common ROIs in the image sequence; a third module for computing a feature vector for each voxel of the common ROIs wherein the feature vector comprises a plurality of texture-based feature values extracted from the common ROIs; a fourth module for computing a difference feature vector for each voxel of the common ROIs wherein the difference feature vector comprises a plurality of differences of the texture-based feature values between successive images of the temporal image sequence; a fifth module for computing from the distance between feature vectors of all voxels in the common ROIs, wherein the QIB is a function of the distance between the feature vectors.

In examples of the second embodiment, the distance is selected from the group consisting of the Manhattan distance, the Euclidian distance and the Chebyshev distance.

In examples of the second embodiment, the registration is performed using an Optimization of Mutual Information algorithm.

In an example of the second embodiment, the texture-based features comprise normalized second-order statistical attributes computed from at least one GLCM for each ROI.

In an example of the second embodiment, the feature vectors are computed by performing a voxel by voxel digital subtraction of the normalized ROI intensities between consecutive images in the temporal sequence to produce a series of difference ROI images.

In still another example of the second embodiment, the second order statistical attributes are selected from the group consisting of Energy, Contrast, Correlation, Variance, Homogeneity, Sum Average, Sum Variance, Sum Entropy, Entropy, Difference Variance, Difference Entropy, Info Measure of Correlation, Maximal Correlation Coefficient.

In yet another example of the second embodiment, the distance is selected from the group consisting of the Manhattan distance, the Euclidian distance and the Chebyshev distance.

In a third embodiment of the disclosure, An image processing apparatus for computing a QIB of disease progression from a first temporal tomographic image sequence of a first modality co-registered with a second temporal tomographic image sequence of a second modality, the apparatus comprising a first identification module for identifying at least one common ROI in each image of the first image sequence based on features extracted in the second image sequence; a second registration module for performing a registration of the common ROIs in the first sequence; a third module for computing a gray-level co-occurrence matrix for each voxel of the common ROIs in the temporal sequence of the first modality; a fourth feature extraction module for extracting a texture based feature vector from the co-occurrence matrix for each voxel the common ROIs; a fifth processing module for computing the distance between the texture-based feature vectors across the common ROIs in the temporal sequence of the first modality.

In an example of the third embodiment, the first modality is CT and the second modality is PET.

In another example of the third embodiment, selecting at least one region of interest (ROI) in the first image of the temporal sequence of tomographic images, wherein the peak standardized uptake value lean (SUL) in the corresponding ROI in the first image is greater than a specified threshold.

In another example of the third embodiment, the distance is selected from the group consisting of the Manhattan distance, the Euclidian distance or the Chebyshev distance.

In another example of the third embodiment, the apparatus further comprises a sixth module to compute an inter-modality co-occurrence matrix for each common ROI in the temporal sequence and a seventh module to compute the distance between the inter-modality co-occurrence matrices of the common ROIs of successive images in the temporal sequence.

In another example of the third embodiment the distance is selected from the group consisting of the Earth Mover's distance and the Divergence of Kullback-Leibler.

FIGURES AND DRAWINGS

FIG. 23 illustrates an embodiment of ROI selection in the lungs.

FIG. 24 illustrates another embodiment of assessing anatomical change using co-occurrence matrix computation.

DETAILED DESCRIPTION

Definitions

Biomarker: A biomarker is an indicator of a specific biological property that can be used to measure the progress of disease or the effects of treatment.

Prognostic biomarker: A biomarker that provides information about the patient's overall outcome, regardless of therapy.

Predictive biomarker: A biomarker that can be used in advance of therapy to estimate response or survival of a specific patient on a specific treatment compared with another treatment.

Quantitative Imaging biomarker: A quantitative imaging biomarker (QIB) is a quantitative metric extracted from features in medical images which correlate with biological properties that can be used to measure disease progression or the effect of treatment.

Texture-based features: We define texture based features as a spatial arrangement of a predefined number of voxels allowing the extraction of complex image properties, and we define a textural feature as a measurement computed using a texture matrix.

Analysis of Single Images

Figure 1:
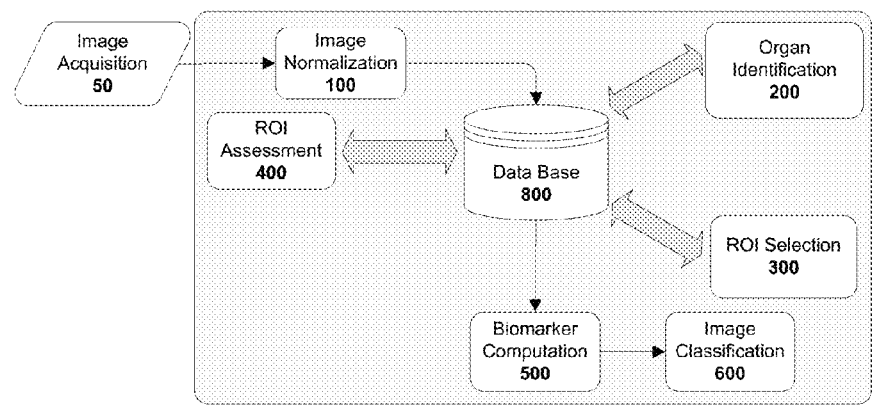
FIG. 1 illustrates a first embodiment of a system for the computation of an quantitative imaging biomarker.

FIG. 1 illustrates a first embodiment of a system for the computation of an quantitative imaging biomarker (QIB) of disease progression or severity based on the evaluation of changes in imaging features extracted from ROIs in a single tomographic image. The system comprises the following processing modules: Acquisition Module 50 acquires medical images of given modality as Computer Tomographic (CT) or Magnetic Resonance (MR) or Positron Emission Tomography (PET) or Single Photon Emission Tomography (SPECT). Normalization Module 100 normalizes the image intensities prior to analysis. In a preferred embodiment, additional pre-processing is applied such as adaptive smoothing, enhancement of signal to noise. Organ Identification Module 200 identifies the organs and other anatomical regions of interest such as the skeleton. ROI Selection Module 300 automatically identifies and selects ROIs representative of normal and abnormal pathology. In a first embodiment, features characteristic of pathology are identified and a classifier is applied to distinguish between nodules and false positives such as vessel crossings or irrelevant diseases. ROI Assessment Module 400 processes the ROI imaging data and extracts a set of imaging features for subsequent ROI classification, including first order statistic such as ROI histogram and maximum intensity as well as second order statistics such as textural features including entropy and energy. Biomarker Assessment Module 500 performs the computation of the quantitative imaging biomarker along with its confidence interval. Classification Module 700 performs the final classification function between responders and non-responders.

Imaging Standardization

Figure 2:
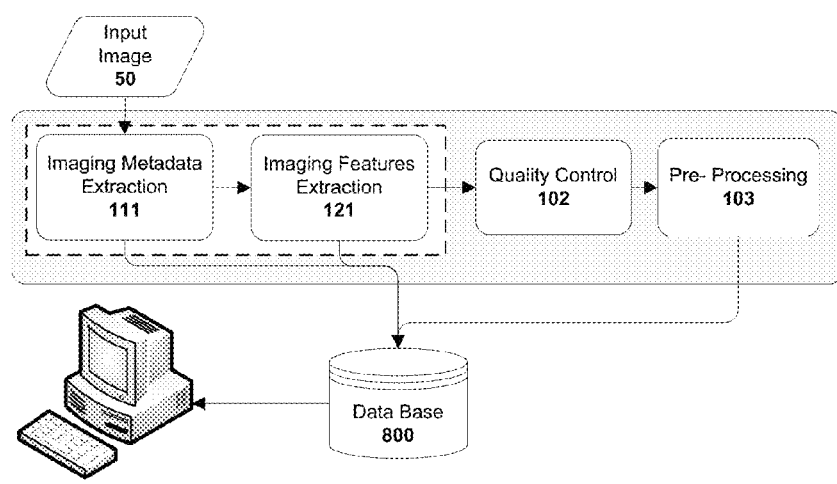
FIG. 2 is an illustration of the image standardization process.

As illustrated in FIG. 2, Module 100 includes several image normalization sub modules as detailed below. This first step in image normalization, Module 111, comprises the extraction of metadata. The metadata is extracted from a Digital Imaging and Communications in Medicine (DICOM) image header (http://medical.nema.org/) or from a questionnaire. Metadata comprises information regarding the imaging modality such as CT, MRI or PET as well as voxel size, radiation dose in case of CT imaging or imaging protocol (T1, T2 . . . ) in case of magnetic resonance imaging. Presence of contrast agent can also be included. A questionnaire may provide information related to patient data such as weight, size, prosthesis, previous local treatment, or prior disease conditions likely to affect biomarker evaluation. The next step of image standardization, Module 121 comprises the extraction of imaging features from the image buffer relying on image analysis functions. Image analysis comprises the detection of the covered Field of View or a binary detection of displayed organs. This module can compute the statistics of image signal as Signal to Noise (SNR) (Jang et al. 2011). In a preferred embodiment, image resolution is obtained from the cutoff frequency of the power spectra. (W. Goodman 1985).

In another preferred embodiment, the presence of image artifacts is detected. Coherency check is performed by checking that the slice thickness is constant along all scan slices. Module 102 comprises the application of rules to previously accumulated imaging features. This step consist in reviewing previously extracted imaging and patient feature to make sure the image and the patient allow to reliably evaluate the biomarker according to the intended use. Module 103 comprises the application of pre-processing functions in order to optimize subsequent image analysis. In a preferred embodiment, the signal to noise of the image entering the system is normalized by adaptive smoothing of the image and consequently the SNR.

Detection of Organs

Figure 3:
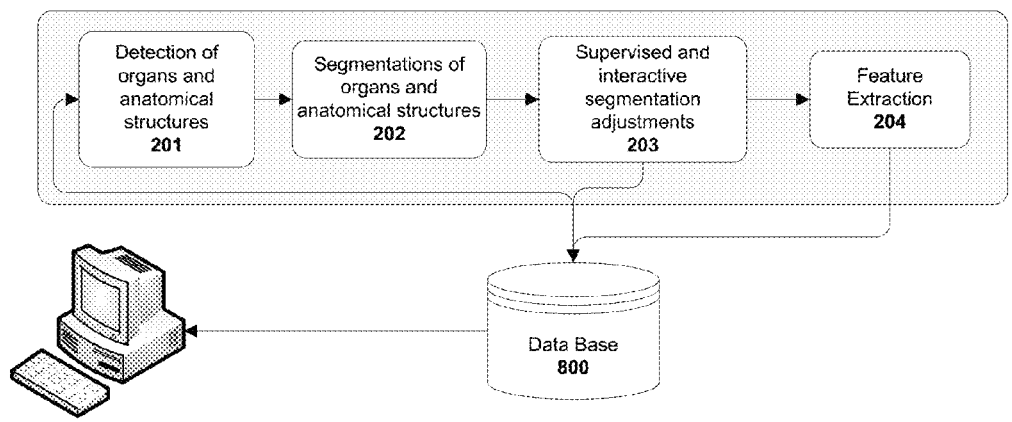
FIG. 3 is an illustration of the organ detection process.
Figure 4:
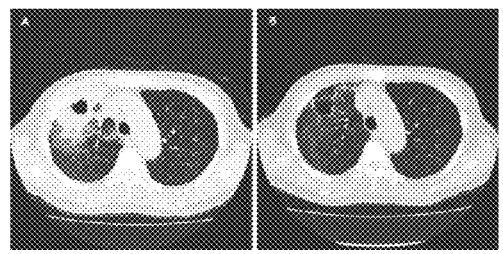
FIG. 4 is an illustration of Chest CT scans of a lesion at two different times.
Figure 5:
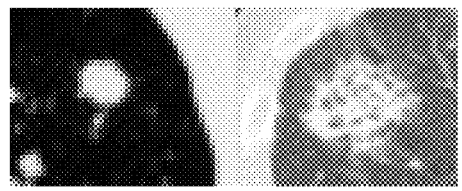
FIG. 5 is an illustration of lesions with and without cavities.

Organ identification is required for a number of other tasks including automated ROI search, scan registration, lesion selection and biomarker computation. As illustrated in FIG. 3, Organ Identification Module 200 includes several sub modules as detailed below. Module 201 comprises the automatic detection of organs and anatomical regions. Automatic detection of organs or anatomical region comprises the detection of lungs, liver, skeleton, skull, spleen, pelvis, kidney, or heart. In a preferred embodiment, all organs of interest are detected and segmented automatically. Methods have been developed for automatically detecting organ position relying on 2D moving windows along axial, coronal or sagittal direction. 2D Haar-like features are computed and classified, for instance, using adaboost. (Zhou, 2012) where heart, liver, spleen, left and right kidney locations are detected using a unified processing module. In another preferred embodiment, the detection is specific to an organ or anatomical region. Several methods based on heuristics such as the likelihood of organ dimension or positioning, statistics of region intensity, statistical atlas and shape models have been proposed. An organ-specific method for the kidneys comprises running a coarse to fine random forest search, performing a classification then computing a probabilistic positioning of both kidneys matched to a kidney atlas (Cuignet, 2012). Module 202 comprises the automated or semi-automated segmentation of organs or of anatomical regions. In a preferred embodiment, the lungs are segmented using a threshold-based algorithm, mathematical morphology operators (erosion/dilation), and a connected component extraction function. In another preferred embodiment, the liver is segmented. Several image processing methods have been proposed for liver segmentation including gray level techniques, learning techniques, model fitting techniques, probabilistic atlases and graph cut algorithms. (Campadelli et al. 2009). In still another embodiment, bones are segmented using thresholding methods that are highly efficient due to high bones intensity in the CT image. In still another embodiment the spleen is segmented using morphological filtering. In such approach a geodesic reconstruction extract roughly the spleen then a pre-processing compute image gradient by applying a spatial filters followed by the morphological filters then a watershed transform controlled by landmarks segment the spleen. (Belgherbi). Module 203 comprises the correction and adjustment of organ and anatomical region segmentation. Considering that segmentations processing are prone to limitations and miss delineations, manual tools are enabled. Such tool can adjust contours. An approach can consist in attaching a high continuous probability in the vicinity of drawn contours that decrease if the distance from contours. Probabilities are recorded into a probability map having same dimension as the segmented area. Probability cumulates when drawing multiple corrections. Last step of the processing is to threshold probability map in order to keep contours having significant likelihood. (Figueiredo, 2005). Module 204 comprises organ and anatomical ROI feature extraction. Such features may be incorporated in the final biomarker or can be considered as an independent complementary biomarker.

Texture Based Features

In a preferred embodiment, we characterize ROIs using texture-based features derived from spatial statistics of voxel gray level values. Depending upon the number of points used to form the local features, the statistical methods are classified into first, second, and higher-order statistics. Textures differing in first-order and second-order statistics can generally be discriminated by a human observer. However, those that differ in their third or higher-order statistics, in general, cannot be discriminated by a human observer.

First Order Statistics

The simplest feature construction method is the histogram-based approach, where features rely on information derived from single-voxel values and their distribution found within a neighborhood window centered on any given voxel. Several statistical properties of the age can be calculated from an image histogram. Mean is the average intensity level of the image. Variance describes how far values lie from the mean, i.e., the roughness of the image. Skewness describes the histogram symmetry about the mean, i.e., whether there is a wider range of darker or lighter pixels than average; positive skewness indicates that there are more pixels below the mean than above, and a negative skewness indicates the opposite. Kurtosis describes the relative flatness of the histogram, i.e., how uniform the grey level distribution is compared to a normal distribution; negative kurtosis describes a flat distribution, and positive kurtosis describes a peaked distribution. Percentiles give the highest grey level value under which a given percentage of the pixels are contained. While simple, many algorithms have incorporated the use of these features.

In another embodiment, a gray level difference statistics (GLDS) algorithm is used to compute first-order statistics of local property values based on absolute differences between pairs of gray levels or of average gray levels.

For any given displacement $\gamma=(\Delta x, \Delta y)$, let $I_\gamma(x, y)=|I(x, y)-I(x+\Delta x, y+\Delta y)|$.

Let $f_\gamma$ be the probability density of $I_\gamma(x, y)$.

If there are L gray levels, this has the form of an L-dimensional vector whose i-th component is the probability that $I_\gamma(x, y)$ will have value i. If the picture I is discrete, it is easy to compute $f_\gamma$ by counting the number of times each value of $I_\gamma(x, y)$ occurs, where $\Delta x$ and $\Delta y$ are integers. In a preferred embodiment, four GLDS measures are used:

Contrast: It is the second moment of $f_\gamma$, whereby it is denoted by:

$$CON1 = \sum_{i=1}^{L} i^2 f_\gamma(i).$$

Angular Second Moment: It is small when the $f_\gamma(i)$ are very similar and large when some values are high and others low, e.g., when the values are concentrated near the origin. This is denoted $$ASM = \sum_{i=1}^{L} f_\gamma(i)^2.$$

Entropy: It is large for equal $f_\gamma(i)$ and small when they are very unequal. It expressed as:

$$ENT1 = -\sum_{i=1}^{L} f_\gamma(i) \cdot \log(f_\gamma(i)).$$

Mean: It is small when the $f_\gamma$ (i) are concentrated near the origin and large when they are far from the origin and is shown by:

$$MEAN = \frac{1}{L}\sum_{i=1}^{L} i \cdot f_\gamma(i).$$

In a preferred embodiment, the above features were calculated for displacements $\gamma=(0, 3), (3, 3), (3, 0), (3, -3)$, where $\gamma=(\Delta x, \Delta y)$.

Second Order Statistics

Figure 6:
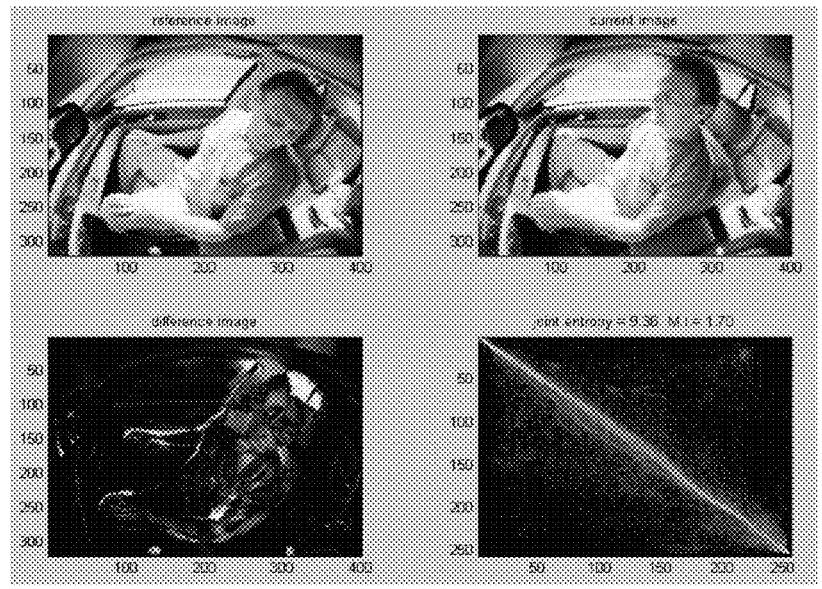
FIG. 6 illustrates the co-occurrence matrix and difference image derived from two images in a sequence.
Figure 7:
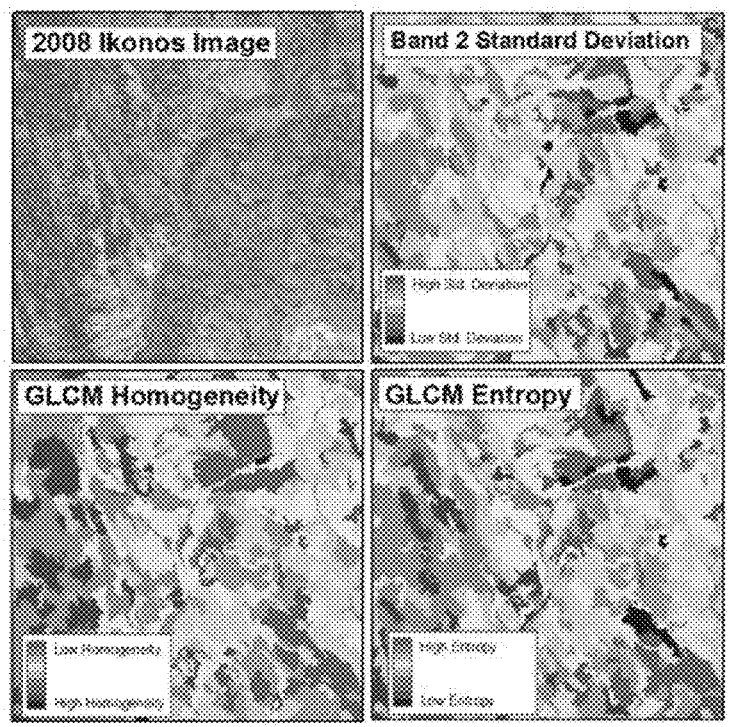
FIG. 7 is a list of the most common texture features.
Figure 8:
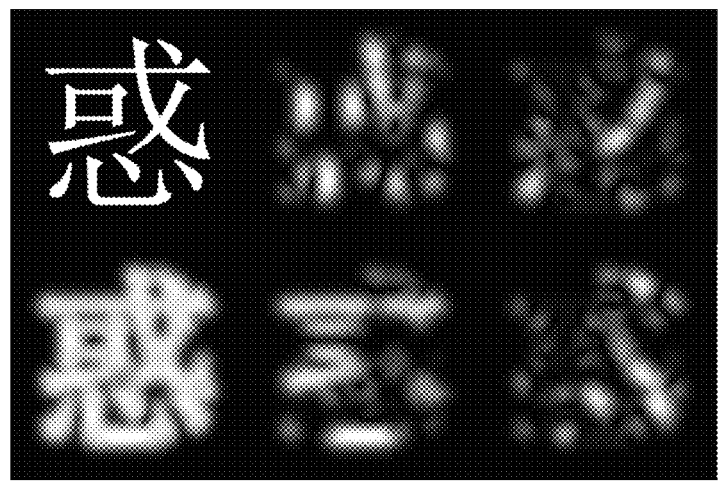
FIG. 8 is an illustration of a Gabor filter applied to Chinese OCR.
Figure 9:
FIG. 9 illustrates a grey level image and corresponding Power Density spectra.

A well-established tool for characterizing the spatial distribution (second-order statistical features) of gray levels in an image is the gray-level co-occurrence matrix (GLCM). The second-order statistical features are derived from the co-occurrence matrix hdθ(i,j) (Haralick, 1979). When divided by the total number of neighboring pixels R(d,θ) in the image, this matrix becomes the estimate of the joint probability, pdθ(i,j), of two pixels, a distance d apart along a given direction θ having particular (co-occurring) values i and j. Two forms of co-occurrence matrix exist—one symmetric where pairs separated by d and −d for a given direction θ are counted, and other not symmetric where only pairs separated by distance d are counted. Formally, given the image f(x,y) with a set of G discrete intensity levels, the matrix hdθ(i,j) is defined such that its (i,j)th entry is equal to the number of times that $f(x_1, y_1) = i$ and $f(x_2, y_2) = j$ where $(x_2, y_2) = (x_1, y_1) + (d \cos θ, d \sin θ)$ This yields a square matrix of dimension equal to the number of intensity levels in the image, for each distance d and orientation θ. The distance and orientation are important parameters in the calculation of a GLCM, because a constant visual texture results in a different GLCM for each distance and orientation. Although in some embodiments a directionally dependent GLCM may be acceptable, it may instead be desirable to use a direction independent GLCM. One way to do this is to average a number of matrices which have been calculated using different displacement vectors. For example, four, six, eight, or any number of different matrices could be averaged. Due to the intensive nature of computations involved, often only the distances d=1 and 2 pixels with angles θ=0°, 45°, 90° and 135° are considered as suggested in (Haralick 1979). If pixel pairs in the image are highly correlated, the entries in hdθ(i,j) will be clustered along the diagonal of the matrix. The classification of fine textures requires small values of d, whereas coarse textures require large values of d. Reduction of the number of intensity levels (by quantizing the image to fewer levels of intensity) helps increase the speed of computation, with some loss of textural information. FIG. 6 displays a gray-level co-occurrence matrix computed from two different but correlated images. From such bivariate distribution, multiple features can be derived. A GLCM may be calculated from an overall visual texture, (e.g., from an entire image, for example in classifying types of textures) or multiple GLCMs may be calculated for local features. In the case of lesion detection, it may be desirable to determine GLCMs for local parts of an image, which may locate any detected lesions more precisely than simply using GLCMs for an entire image. There are multiple ways to extract localized GLCMs from an image. One way to produce localized GLCMs involves sliding a "window" of a certain size (e.g., 7×7 or 10×10) over an ROI, calculating a GLCM for that window, and associating it with the center pixel of that window. The window may then be slid to another portion of the ROI, another GLCM may be calculated, and the new GLCM may be associated with the new center pixel of the new ROI portion. This may be continued any number of times to produce a desired number of GLCMs. Another way to produce localized GLCMs involves dividing the image into a number of non-overlapping ROIs and calculating the GLCM for each ROI. In both methods, the size of the window may be modified as desired in order to achieve the desired level of localization.

In a preferred embodiment, the GLCM computations are extended to 3D volumes. In 3D form, grey level co-occurrence matrices are defined as three dimensional matrices of the joint probability of occurrence of a pair of grey values separated by a displacement d=(dx, dy, dz). In a preferred embodiment, four distances with 1, 2, 4, and 8 voxels respectively and thirteen directions, will produce 52 (4×13) displacement vectors and thereafter 52 co-occurrence matrices. In a preferred embodiment, volumetric ROIs of fixed 64×64× 64 dimensions encompassing lesions of interest are identified. One or more reference ROIs is also identified. Each ROI image is divided into overlapping 7×7 windows, the statistical texture values are computed on each window in four different directions and then averaged for rotational invariance.

The principal second-order statistical attributes derived from a co-occurrence matrix include:

Energy: Energy, also called the angular second moment, is a measure of textual uniformity, that is, whether or not the feature value is spatially repeated. A larger value indicates more uniformity of the feature (that is, there is a repetitive structure).

$$ENE = \sum_{i=1}^{L}\sum_{j=1}^{L} P(i, j; d, \theta)^2.$$

Entropy: Entropy is measure of disorder of the image. Entropy is maximal when the matrix elements are equal, which indicates that the feature value has a larger degree of randomness.

$$ENT = -\sum_{i=1}^{L}\sum_{j=1}^{L} P(i, j; d, \theta) \cdot \log(P(i, j; d, \theta)).$$

Contrast: Contrast is a measure of the local variation present in the image. Contrast is higher when the feature values show large and abrupt changes in space. When contrast is high, homogeneity is generally lower.

$$CON = \sum_{i=1}^{L}\sum_{j=1}^{L} (i-j)^2 \cdot P(i, j; d, \theta).$$

Homogeneity: Homogeneity, also called the inverse difference moment, is higher when the image is smooth and the range of feature values is small.

$$HOM = \sum_{i=1}^{L}\sum_{j=1}^{L} \frac{1}{1+(i-j)^2} P(i,j;d,\theta).$$

Correlation: Correlation measures the linear dependencies of the grey levels in the image. Correlation is higher when the feature values are spatially closer to a linear structure.

$$COR = \sum_{i=1}^{L}\sum_{j=1}^{L} [ijP(i,j;d,\theta) - \mu_x \mu_y]/(\delta_x, \delta_y).$$

Additional second-order statistical attributes include Sum of Square Variance, Sum Average, Sum Variance, Sum Entropy, Difference Variance, Difference Entropy, Info Measure of Correlation, Info Measure of Correlation, Maximal Correlation Coefficient.

Higher Order Statistics

A statistics is called higher order if it involves three or more pixels. Two different higher order statistics methods are used in the context of image feature analysis. These feature construction methods are namely Neighborhood Grey Tone Difference Matrix (NGTDM) and Grey Tone Run Length Matrix (GTRLM). Textural features extracted from the NGTDM are coarseness, contrast, busyness, complexity, and texture strength. (Adamasum and King, 1989).

Coarseness refers to the density of edge elements; the finer the texture, the higher the edge density. In a coarse texture grey-tone differences are small indicating that the primitives (building blocks) making up the texture are large. The coarseness measure is obtained from the reciprocal of the summation of intensities at all points in relation to the intensity of the surrounding neighbors, However in the summation each entry is weighted by the probability of occurrence of the corresponding intensity value pi. The coarseness of an abnormal ROI is supposed to be different from the coarseness of normal ROI.

Coarseness is expressed as:

$$COA = \left[\sum_{i=1}^{L} p_i s(i)\right]^{-1}.$$

Contrast is another feature constructed from the NGTDM. This conceptually simple property enables the distinction between texture classes when clearly different intensity levels are visible. Probably the most influential property of contrast is the dynamic range of grey-levels in an image. If it is large, it usually corresponds to a high difference in intensity and consequently a large value of contrast. In addition, the period at which the pattern repeats, or its spatial frequency, can be quantified by contrast.

Contrast is expressed as:

$$CON2 = \frac{1}{N_g(N_g-1)} \sum_{i=1}^{L}\sum_{j=1}^{L} p_i p_j (i-j)^2 \cdot \frac{1}{n^2} \sum_{i=1}^{L} s(i).$$

Busyness is another useful NGTDM constructed feature. A busy texture is a texture in which there are quick changes of intensity from one pixel to its neighbor. In other words, the spatial rate of intensity changes is very high. If these changes are small in magnitude, they may not be visually obvious and a high level of local uniformity in intensity may be apparent. On the other hand, if the spatial rate of changes in intensity is low, a high degree of local uniformity may still be perceived, even if the magnitude of the changes is large. While the spatial rate of intensity changes reflects the level of busyness, the magnitude of these changes depends upon the dynamic range of gray scale, and thus relates to contrast. This feature fits as a measure of change in texture as abnormal regions are expected to be busier (have more rapid changes) than their normal counterparts.

Busyness is expressed as:

$$BUS = \sum_{i=1}^{L} p_i s(i) \Big/ \sum_{i=1}^{L}\sum_{j=1}^{L} (ip_i - jp_j).$$

Complexity is connected with the amount of information that is present within a textured object. A texture having large number of primitives, each having varying average intensities, is said to be a complex texture. Therefore, clearly for a texture having many primitives, each bounded by edges, the measure of complexity is expected to be an informative feature for ROIs characteristics as the abnormal regions are expected to be more complex.

Complexity is expressed as:

$$COM = \sum_{i=1}^{L}\sum_{j=1}^{L} \{(|i-j|)/(n^2(p_i+p_j))\}\{[p_i s(i) + p_j s(j)]\}.$$

Strength refers to a texture where the primitives that comprise it are easily definable and clearly visible.

Texture strength is expressed as:

$$STR = \sum_{i=1}^{L}\sum_{j=1}^{L} (p_i + p_j)(i-j)^2 \Big/ \sum_{i=1}^{L} s(i).$$

Another popular technique based on gray-level spatial dependencies that was extended to 3-D is the run-length encoding (RLE) analysis (Galloway, 1975). A gray-level run is a sequence of consecutive, collinear voxels having the same gray level value. For a given direction, a matrix Q(m, l) can be built by storing the number of times that the picture contains a run of length l, consisting of collinear voxels having gray level m oriented along a direction ($\Theta,\Phi$). These matrices can be calculated for different run angles. RLEs require similar gray-level reductions and choice of directions as GLCMs In a preferred embodiment, the orientations of horizontal, vertical and two diagonals are calculated. Long and short run emphasis parameters give measures of proportions of runs with long and short lengths. Short run emphasis is expected to be larger in coarser images, and long run emphasis is larger in smoother images. Grey level non-uniformity calculates how uniformly runs are distributed among the grey levels; it takes small values when the distribution of runs is uniform. Similarly, run length non-uniformity measures the distribution of grey levels among the run lengths. The fraction of image in runs describes the fraction of image pixels that are part of any run available in the defined matrix. Run-length matrix based features include: run-length non-uniformity, grey level non-uniformity, long run emphasis, short run emphasis, fraction of image in runs.

TABLE 1

List of texture features

| TYPE | DESCRIPTION |
|---|---|
| FOS | Mean |
| | Variance |
| | Skew |
| | Kurtosis |
| GLDS | Contrast |
| | Angular Second Moment |
| | Entropy |
| | Mean |
| GLCM | Contrast |
| | Energy |
| | Entropy |
| | Homogeneity |
| | Correlation |
| NGTDM | Coarseness |
| | Contrast |
| | Busyness |
| | Complexity |
| | Strength |
| GTRLM | Run Length Uniformity |
| | Gray level Non-Uniformity |
| | Long Run Emphasis |
| | Short Run Emphasis |
| | Fraction of Image in Runs |

Feature Signatures

In a preferred embodiment, the tomographic image dynamic range is down-scaled since the processing required to calculate a GLCM for the full dynamic range of a tomographic image is prohibitive. Typically, histograms with fixed sized bins are used to reduce the number of gray levels. For some images often only a small fraction of the bins contain significant information, while most others are hardly populated. A finely quantized histogram is highly inefficient in this case. On the other hand, for images that contain a large amount of information, a coarsely quantized histogram would be inadequate. Because histograms are fixed-size structures, they cannot achieve a good balance between expressiveness and efficiency. A signature $\{s_j=(m_j, w_{mj})\}$, on the other hand, represents a set of feature clusters. Each cluster is represented by its mean (or mode) $m_j$, and by the fraction $w_{mj}$ of pixels that belong to that cluster. The integer subscript j ranges from one to a value that varies with the complexity of the particular image. While j is simply an integer, the representative $m_j$ is a d-dimensional vector. In general, vector quantization algorithms can be used for the clustering, as long as they are applied on every image independently, and they adjust the number of clusters to the complexities of the individual images. A histogram $\{h_i\}$ can be viewed as a signature in which the vectors i index a set of clusters defined by a fixed a priori partitioning of the underlying space. If vector i maps to cluster j, the point $m_j$ is the central value in bin i of the histogram, and $w_{mj}$ is equal to $h_i$. The texture value distribution for each ROI therefore forms the input to the specific ROI signature. In a preferred embodiment, a representative signature $\{s_j=(m_j, w_{mj})\}$ is a set of feature clusters where each cluster is represented by its mean $m_j$ and by $w_{mj}$, the fractional weight of that cluster. A specific signature is made of histograms whose clusters are pre-determined by the binning size and whose weights are fractional values of the normalized histogram. For each ROI and texture-derived feature a signature is constructed by adaptive binning its corresponding histogram in j bins of varying size. These adaptive bins are produced by clustering the histogram using an optimal k-means algorithm implemented using dynamic programming. At the end of this process, assuming we have m feature distributions, one target ROI and one reference ROI, we now have 2 m signatures for each tomographic image, m from the reference ROI and m from the target ROI.

Distance Between Distributions

In a preferred embodiment, the Earth Mover's Distance (EMD), is used as a distance metric between signatures for image comparison in different feature spaces. The EMD is a cross bin similarity metric that computes the minimal cost to transform one distribution into another. (Andoni, 2007). Given two signatures P=(p1, wp1), . . . (pm, wpm) with m clusters and Q=(q1, wq1), . . . (qm, wqm) with n clusters; and D=[dij] where dij is the Euclidean distance between pi and qj. We want to find a flow F=[fij] so that the cost equation can be minimized.

$$WORK\ (P, Q, F) = \sum_{i=1}^{m} \sum_{i=1}^{n} d_{ij} f_{ij}.$$

Once we have found the optimal flow F, the EMD is defined as the resulting work normalized by the total flow:

$$EMD(P, Q) = \frac{\sum_{i=1}^{m} \sum_{j=1}^{n} d_{ij} f_{ij}}{\sum_{i=1}^{m} \sum_{j=1}^{n} f_{iy}},$$

In another preferred embodiment, the Divergence of Kullback-Leibler (Kullback, 1959) extended to bivariate distributions is used. Having two discrete distributions, P and Q, the K-L Divergence of distribution Q relative to distribution P is given by:

$$D_{KL}\langle P | Q \rangle = \sum_{i} P(i) \log \frac{P(i)}{Q(i)}$$

ROI Detection & Selection

Figure 10:
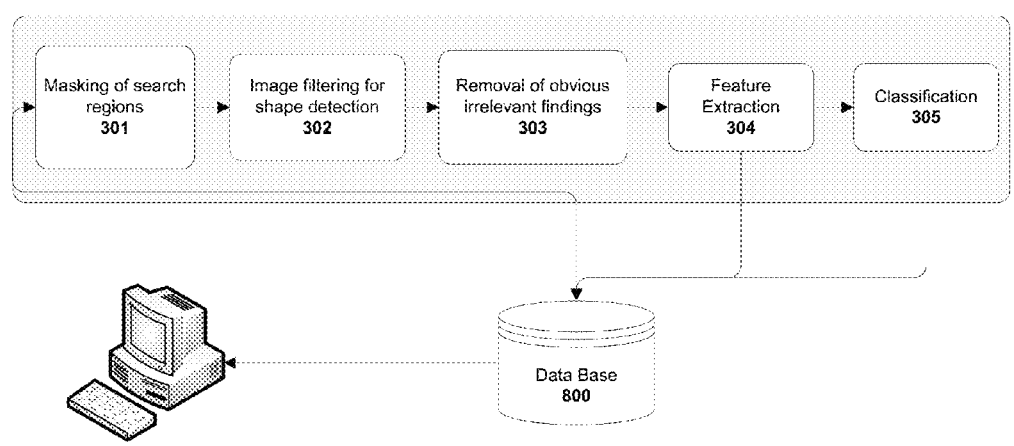
FIG. 10 is an illustration of the LMS lesion detection process.

As illustrated in FIG. 10, ROI Selection Module 300 comprises several sub modules detailed below where different techniques are used depending of the type of organ and lesions are detected. In a preferred embodiment, lung ROIs are selected by first defining a lung mask using multi-segment active shape mode, then using a two-stage nodule-enhancement technique. A clustering watershed algorithm then detects candidate before computing more than thirty features that feed a Support Vector Machine classifier. (Chen, Suzuki, MacMahon, 2011). In another embodiment, liver lesions are identified utilizing a boosting tree to classify points the liver as either lesion or parenchyma. An iterative scheme is integrated that incorporates knowledge gained from earlier iteration into later decisions. (Militzer, 2010). In another embodiment, colon polypes are identified using different features as curvature and shape histograms. (Wang, Yao, Petrick et al. 2010). In still another embodiment, kidney lesions are identified using level-sets and a statistical refinement step to adapt to the shape of the lesions. From the segmented lesions, the histograms of curvature-related features were used to classify the lesion types via random sampling. (Linguraru, 2009).

Figure 11:
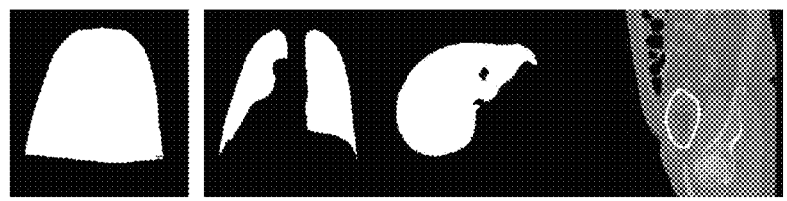
FIG. 11 illustrates organ masking performed during ROI search.
Figure 12:
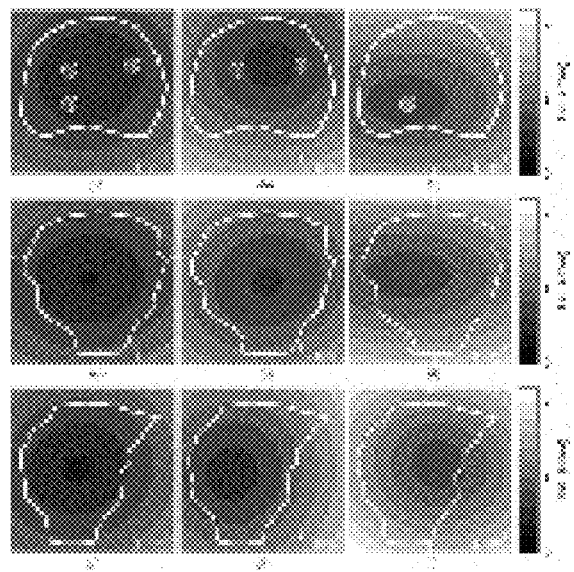
FIG. 12 illustrates contours ROIs superimposed with probabilistic map masks.

Module 301 comprises the selection of the region where findings must be searched. In a preferred embodiment, the search is restricted to a precise region defined by a previously segmented organ or anatomic region. FIG. 11 illustrates several masks used to focus the search to lung, liver or spleen regions. In another embodiment, instead of relying on binary identification of the region, the search relies on a probabilistic atlas. In a preferred embodiment, the search is avoided in regions having a poor likelihood of detecting findings. In lymph node search for instance, previous masks illustrated in FIG. 12 inhibit the search. Module 302 carries out the early detection of findings. Different approaches are used depending on the kind of lesions targeted. In a preferred embodiment, lung lesions are detected with enhanced filtering methods where multiscale enhancement filters improve the sensitivity for nodule detection. Such system is based on the undecimated wavelet transform and the eigenvalues of Yu matrix in multiplanar slices. As a preprocessing step, enhancement filter can simultaneously enhance blob-like objects and suppress line-like structures. (Yang Yu, 2006). Module 303 narrows the detection of findings prior to the classification step. In a preferred embodiment, only findings conforming to some basic features such as size, location or intensity are chosen. In another embodiment, the number of findings is limited. Module 304 extracts a significant set of texture-based features suitable for subsequent classification processing. Module 305 performs advanced classification. In an embodiment, the module relies on Linear Discriminant Analysis (LDA) or preferably Quadratic Discriminant Analysis (QDA). QDA is closely related to linear discriminant analysis (LDA), where it is assumed that the measurements are normally distributed. Unlike LDA however, in QDA there is no assumption that the covariance of each of the classes is identical. (Duanskas, 2001) In a preferred embodiment, a classification algorithm based on a generalized discriminant analysis (GDA) implementing Support Vector Machine (SVM) methods is used (Baudat, 2000). The classification schemes differ depending on the kind of classifier and on the layout of the classification phase. Cascade classification or parallel classification may be implemented. In a preferred embodiment, the classifier is used as part of a lung nodule detection system. Feature-extraction techniques, such as tests for circularity, size, and their variation with threshold level, are applied so that suspected nodules can be isolated (Giger, 1988). The ROIs found by the processing modules are then displayed to the user as markers (one marker per 3D region of interest). The results are findings associated with their positions generated by the finding identification method, producing findings of the "automatic" origin and the "region of interest" status.

ROI Assessment

Figure 13:
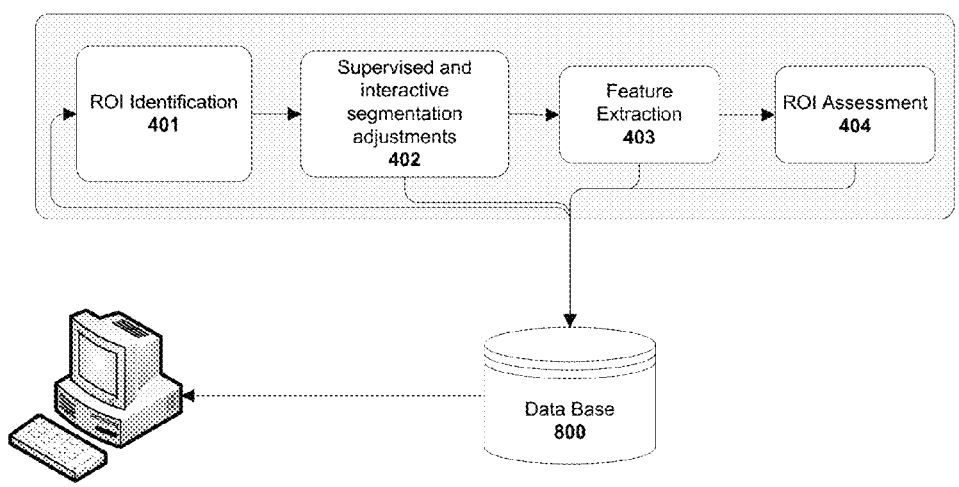
FIG. 13 illustrates the interactive evaluation of lesions and ROI process.

As illustrated in FIG. 13, ROI Assessment Module 400 comprises the evaluation of ROIs. In a preferred embodiment, Module 400 evaluates ROIs which are first detected by Module 300. In another preferred embodiment ROIs detected by Module 300 have been confirmed by experts before they evaluated. In another embodiment, ROIs automatically detected by Module 300 are added to a set of visually identified ROIs. Visual detection of ROIs is based on a set of display tools, the semi-automatic segmentation of ROIs with the ability to adjust, correct and refine the segmentations. Once segmentation is completed, a set of features are extracted in order to contribute to biomarker design. Ultimately the biomarker value provides users with feedback regarding lesions characteristics. Such lesions assessment can be initiated based on output of Module 300 or from scratch, considering reviewer expertise only.

Module 400 comprises the analysis of different kind of lesions for different purpose as screening, response assessment or just patient follow up. In a preferred embodiment Module 400 comprises the characterization of nodules in thorax images as malignant or benign. Based on contours, several quantitative measures are extracted related to each nodule's size, shape, attenuation, distribution of attenuation, and texture. A stepwise discriminant analysis is performed to determine which combination of measures is best able to discriminate between the benign and malignant nodule. (Mc-Nitt-Gray, 1999). In another embodiment, the module estimates the likelihood that a lesion can be accurately measured or is likely to be part of a criteria evaluation. Training is performed based on the largest variability in re-measuring lesions, a stepwise discriminant analysis which combination of feature is best able to discriminate between reliably measurable and non-reliably measurable nodule. (Beaumont, 2013).

Module 401 comprises the visual detection of findings. Unlike Module 300 where detection is automatic, the identification and selection of lesions is either based on findings automatically identified by Module 300 or based only on expert decision. In the process of segmenting lesions, Module 402 enable Semi-automatic and manual delineation methods. Semi-automatic segmentation can be lesion specific, as dedicated to lung isolated lesions, juxtapleural lung lesion, hyper-attenuated liver lesion, hypo attenuated liver lesions, polyps, flat polyps, kidney lesions, spleen lesions, lymph nodes, lymphoma. In a preferred embodiment, semi-automated segmentation provides means to correct or adjust more interactively the prime semi-automated segmentation. In still another embodiment, independent fully manual tools are provided to either delineate lesions from scratch or to correct output from semi-automated segmentations. Module 403 comprises feature extraction, where a feature can be similar or a sub-set of those listed for Module 204. An embodiment of Module 404 comprises the computation of the final biomarker based on previous Modules outputs such as Module 200 computing organs or anatomic regions. In another embodiment, a biomarker stricto sensus is not computed but feedback about lesion characteristic such as measurability is reported.

Biomarker Measurement

Module 600 of FIG. 1 comprises the measurement of a quantitative imaging biomarker from a tomographic image along with an estimate of the reliability of the measurement. Complex biomarker measurement can be carried out combining textural, statistical and morphometric features. In a preferred embodiment, textural features extracted from a gray-level co-occurrence matrix of selected ROI are computed. A feature signature is produced. In another embodiment, the biomarker is the tumor to liver volume ratio (TTLVR). It is well known that liver volume is highly variable. It has also been shown that in the absence of a change in patient condition that lesion size varies proportionally with the organ size; therefore it is necessary to normalize lesion variation to liver size. (Jia-Wen Zhang, 2010). In still another embodiment, the biomarker is the modified RECIST (mRECIST) criteria. This criteria derive straightforwardly from RECIST but considering measurement from hyper-attenuated region only. (Edeline, 2012). In another embodiment, the lesion density distribution computed at Module 400, is compared to the density distribution of the host organ computed at Module 200.

In a preferred embodiment, a biomarker of disease progression is computed from the steps comprising identifying at least one common ROI in each image of the temporal sequence; performing a voxel by voxel registration of the common ROIs in the image sequence; computing a feature vector for each voxel of the common ROIs wherein the feature vector comprises a plurality of texture-based feature values extracted from the common ROIs; computing a difference feature vector for each voxel of the common ROIs wherein the difference feature vector comprises a plurality of differences of the texture-based feature values between successive images of the temporal image sequence; computing from the distance between feature vectors of all voxels in the common ROIs, wherein the QIB is a function of the distance between the feature vectors.

In a preferred embodiment, the biomarker of disease progression is the distance between the two feature vectors. In a preferred embodiment, this distance is the Manhattan distance, the Euclidian distance or the Chebyshev distance.

Advanced Display

Figure 14:
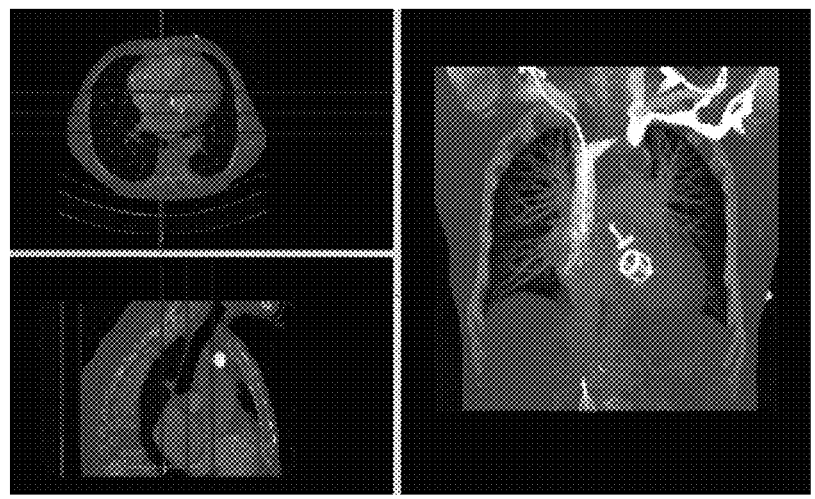
FIG. 14 illustrates a Multi Planar Reconstruction (MPR) display.
Figure 15:
FIG. 15 illustrates a scout image as used for planning a CT scan.
Figure 16:
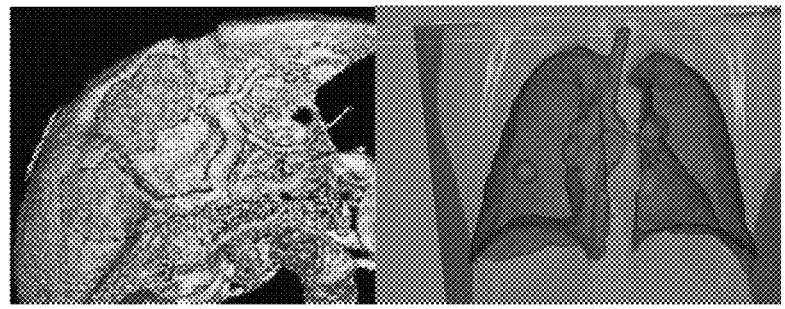
FIG. 16 illustrates the surface and volume rendering of the liver.
Figure 17:
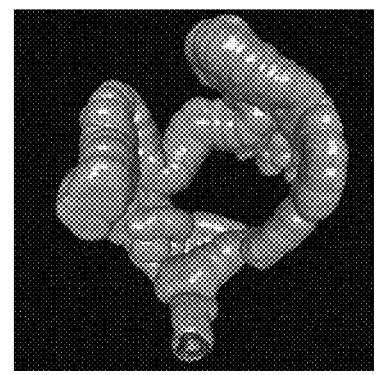
FIG. 17 illustrates the surface rendering display for fly-through application.

Module 700 comprises advanced display capabilities as it has been long shown that advanced display is beneficial for reviewing performance. Study emphasized that some advanced display, or enabling several kind of different display improve users performances. Multiplanar (MPR) display as illustrated in FIG. 14 appear the most basic requirement and particularly useful to inspect small details. Volume rendering and surface rendering is required to figure out the global context or ROI. (Choplin, 2004). As illustrated in FIG. 15, scout image is available to help global overview of the Field of View. In addition to its benefits in acquisition management and device positioning, improved image processing can be required particularly in using advanced filtering (Yufeng Zheng, 2003). As a standard, multi planar display is available and improves quantification. (Ridge: 2013). As illustrated in FIG. 16, interactive 3D volume rendering of organs and lesions is available and enjoys widespread acceptance in the medical community. (Calhoun, 1999). Lesions may be superimposed on the 3D volume rendering. Virtual colonoscopy is illustrated in FIG. 17 with fly through capability enabled. Quantitative experimental results on 15 clinical datasets have shown that the average surface visibility coverage is 99.59+/−0.2%. (Hassouna, 2006).

Analysis of Temporal Sequence of Images

Figure 18:
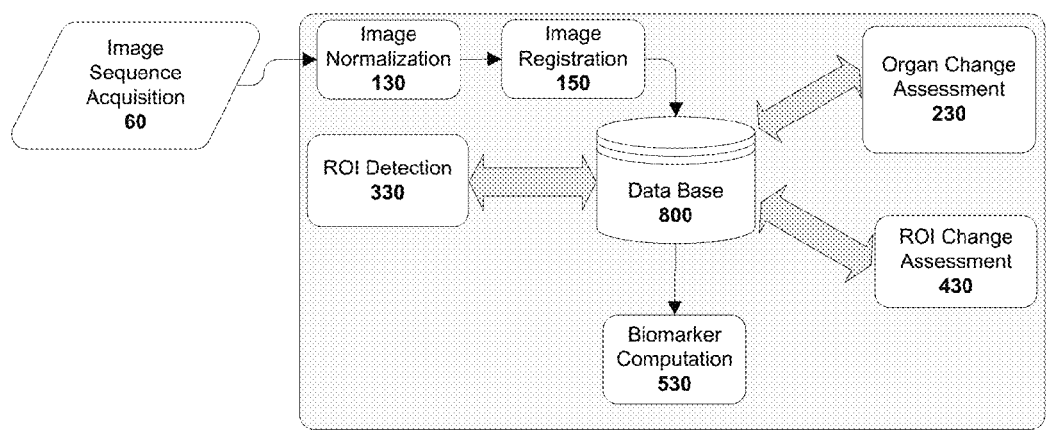
FIG. 18 illustrates a global biomarker evaluation system based on image difference.

FIG. 18 illustrates another embodiment of a system for the computation of a QIB based on a temporal sequence of tomographic images. To facilitate quantitative analysis, the system registers the temporal images on a voxel-by-voxel basis. This registration is then used for synchronous navigation between the successive images and for the automated pairing of ROIs identified in the images. In such a context, the imaging biomarker is a marker of disease progression.

In order to avoid segmenting individual organs or lesions, the system computes local differences around the ROIs of interest and extracts metrics from the difference. Such a method applies to circumstances when a change in a biomarker is computed between images acquired at different times. Such a process does not require a segmentation step. Such embodiment requires registration prior to subtracting corresponding ROIs.

An additional module is inserted as Module 150 of registration after Module 130. Module 150 comprises the global registration of the two input images. Registration can be either rigid, affine or elastic. A preferred embodiment comprises the use of an Optimization of Mutual Information algorithm that compute co-occurrence matrix and extract corresponding statistical feature for any shift position between images. (Pluim, 2003). Once registered, images can be displayed for users taking benefits of a side-by-side display improving review and localization of structures and lesions.

Figure 19:
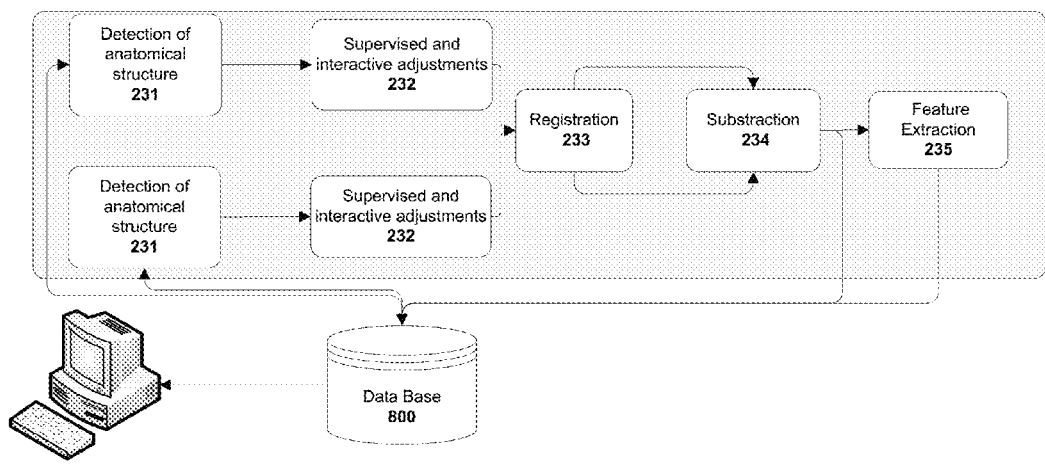
FIG. 19 illustrates a first embodiment of anatomical change detection.

FIG. 19 displays the flowchart of Module 230 for the present embodiment that comprises Module 231 performing organ detection and positioning of the two images. The two images are processed independently; processing can be performed in parallel. In another embodiment, positioning of an organ in an image can considerer positioning computed into the other image. Positioning can be embodied by a 3D point coordinate near center of mass of organ, by a bounding box or by a ROI of fixed dimension aligned over the center of mass of the organ. Detection of organ applies to the liver or spleen or the heart. Module 232 performs correction and adjustment of organ positioning. The two images can be processed independently or can take advantage of the last processed registration transformation. In a preferred embodiment, the images are automatically registered to an atlas or reference image. Another embodiment is to move manually the ROI in order to completely overlap the organ. In another embodiment a 3D point coordinate is moved to superimpose the organ. In another embodiment, a bounding box is adjusted to fit organ dimensions. Module 233 enabling local ROIs registration of ROIs. If ROI are not too large, an embodiment of the registration can be considered local and enable rigid affine registration. In a preferred embodiment, the ROIs are resampled in order to conform to same sampling rate and are properly registered. The two ROIs must have the same dimensions along x, y and z axes. Module 234 computes the image difference. Difference is computed between voxels having the same x, y and z coordinates.

Module 235 extracts various features from the difference image. Features can be derived from the parameters of the intensity distribution of the difference. In a preferred embodiment, the sum of the signed difference value is extracted.

$$\Delta_I = \sum_{ROI} I_1(x, y, z) - I_2(x, y, z)$$

Another preferred embodiment corresponds to measure a difference in the tissue density derived from the sum of the signed difference value multiplied by voxel volume (Vox) multiplied by a linear relationship between Intensity in the image (I) and tissue density ($\alpha$). In another embodiment the Module utilizes a nonlinear relationship between intensity and tissue density making $\alpha$ a complex function.

$$\Delta_{Mass} = \alpha \times Vox \times \sum_{ROI} I_1(x, y, z) - I_2(x, y, z)$$

Figure 20:
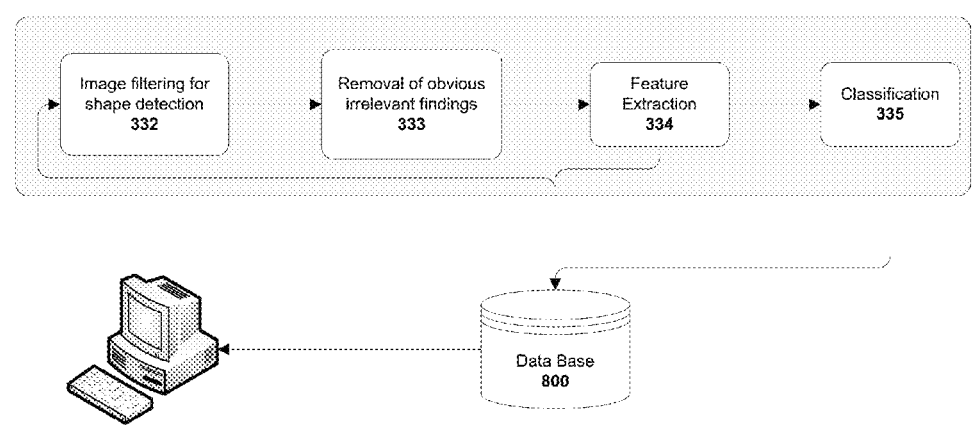
FIG. 20 illustrates a first embodiment of lesion detection.

FIG. 20 illustrates an embodiment of automatic lesion detection based on image difference. Input data is the image difference between two different images of the sequence. First step of automatic lesion detection is Module 332 that process shape detection relying on enhanced filtering across the whole image difference. Blob-like structures are enhanced, line-like structure are enhanced and plane-like structure are enhanced. Next step is Module 333 where irrelevant findings are removed. At that step, the three enhanced filters are thresholded in order to binarize enhanced signal. Line-like and plane-like binarized images are masking blob-like binarized image keeping visible and outputting only blobs binarized masked image. At that steps blob-like structures having too small dimensions or being categorized as irrelevant are discarded. Next Module 334, computes a plurality of imaging features such as listed on Table 2, that are passed to Module 335 performing a classification according to a pre-trained phase. Output of Module 335 is a binary status about disappeared lesions and new lesions appeared between the two examinations.

Figure 21:
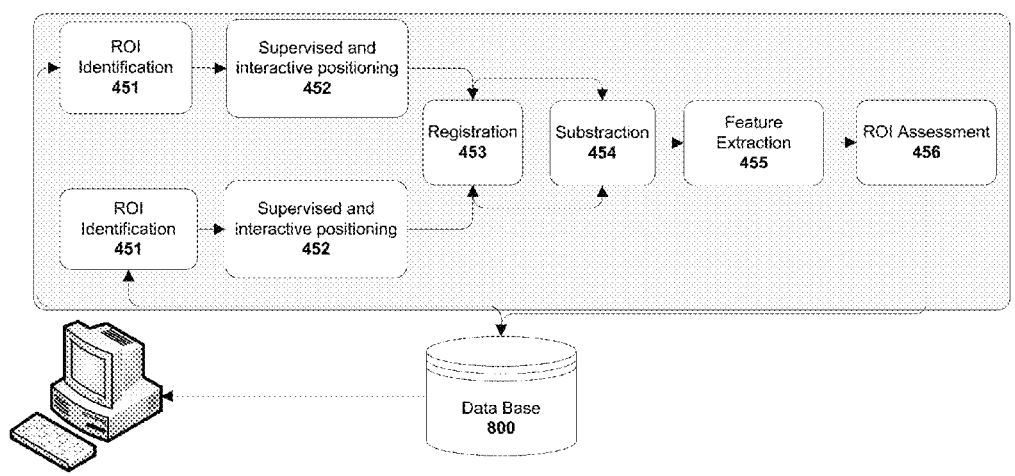
FIG. 21 illustrates a first embodiment of lesion characterization.

FIG. 21 illustrates the flowchart of the processing detailing Module 430 for the present embodiment that comprises Module 451 for lesion selection where the lesions in the two different images can be selected independently. A preferred embodiment relies on the global image registration with a synchronized side-by-side display where selecting a lesion in an image fetch the corresponding coordinate and, thus, the same lesion in the other image. Module 452 performs manual and interactive positioning. In a preferred embodiment the module performs an automatic elastic registration to a reference image. In another preferred embodiment setting the position in one image, automatically adjust the position of the same finding into the other image. A preferred embodiment define lesion positioning as a bounding box of pre-defined fixed dimension centered around a user defined 3D point coordinate. Another embodiment considers positioning as just a 3D point coordinate defined by user. Another preferred embodiment consists in a user defined bounding box having a user defined dimension center around a user defined central position. Module 453 enables a local registration based on previously defined position. In a preferred embodiment a rigid-affine registration is performed if the lesions are not too large. In another preferred embodiment an Optimized Mutual Information system is computed. Module 454 performs a resampling and resizing of images in order to allow a voxel wise difference. Module 455 computes the difference images between the reference image and each image in the sequence.

According to features computed in Module 455 and listed on Table 2, Module 456 characterizes lesions relying on a classification step. In a preferred embodiment, a SVM system is run. In a preferred embodiment, Module 456 aims at classifying lesions between malignant lesions and benign lesions. In another embodiment, this module aims at identifying the most reliable lesion suitable for response evaluation.

Texture-Based Imaging Biomarkers

A major limitation of quantitative imaging biomarkers based on morphological features is that they depend on the segmentation process used. Segmentation processes require defining the boundary of ROIs and findings but such processes are subject to inter and intra-operator variability. As a consequence, the quantitative assessment of imaging biomarkers dependent on the segmentation of lesions and ROI contours is highly operator dependent. Even automated segmentation methods involve the selection of arbitrary parameters such as thresholds not tied to any objective biological processes. An alternative involves computing imaging biomarkers based on textural features not dependent on segmentation.

In a first embodiment of such a quantitative imaging biomarker, as illustrated in FIG. 23, ROIs are defined without prior segmentation of the organ or anatomical structures. Textural features are extracted from a fixed ROI of pre-defined dimensions and a biomarker is subsequently computed. FIG. 24 illustrates a preferred embodiment of a method to assess disease progression. Module 220 that is a preferred embodiment of the assessment of organ and other anatomical structures processing. Module 221 that encompass organ detection and positioning, Module 222 enabling correction and adjustment and Module 223 processing feature extractions relying on Gray Level Co-occurrence Matrix (GLCM) of given shift and direction. Co-occurrence matrices are calculated for all the intensity-normalized ROIs in the temporal image sequence. The GLCM is built by incrementing locations, where certain gray levels i and j occur distance d apart from each other. To normalize the GLCM, its values are divided by total number of increments. Features energy, entropy, contrast and inverse difference moment are calculated from each co-occurrence matrix and their values are saved in the feature vector of the corresponding image. In order to avoid features with larger values having more influence in the cost function (Euclidean distance) than features with smaller values, feature values inside each feature class are normalized in the range [0,1].

Module 221 performs organ detection and positioning. In a preferred embodiment, organ detection is performed using an advanced probabilistic atlas considering the random variable "organ position" of different kinds of tissues. (Torbjørn Vik, 2012). In a preferred embodiment, a ROI of predefined fixed dimension is defined centered around a 3D point coordinate corresponding to the point included in the organ nearest to the center of gravity. In another embodiment, the position of the organ is based on the 3D point coordinates of the organ. In still another embodiment, the position is defined by the bounding box of the organ. In a preferred embodiment Liver and spleen position are detected. In another embodiment the lungs are detected. In still another embodiment the heart is detected. Module 222 comprises manual or automated adjustment of organ positioning. A preferred embodiment comprises an automatic elastic registration to an atlas or reference image (Pluim, 2003). Another embodiment is to position manually the ROI in order to completely overlap the organ. In another embodiment a 3D point coordinate is moved to superimpose the organ. In another embodiment bounding box edges are adjusted to fit organ dimensions. Module 223 comprises extracting imaging features not requiring segmentations selected from the list in Table 2 below.

TABLE 2

List of example of imaging feature that can be extracted without segmenting ROIs

| NAME | DESCRIPTION |
| --- | --- |
| Sphericity | Index to report about shape sphericity |
| Shape Index | Continuous value classifying shapes |
| Curvature Index | Magnitude of curvature |
| Cavitation | Existing or number of cavitations of 3D shapes |
| Parameters of Intensity Distribution | Parameters derived from histograms of intensity |
| Distribution value of Enhanced filters | Parameters Histograms of Enhanced filtered images |
| Co-occurrence derived | Bivariate distribution of correlated images |
| Haralick's | Statistics derived from co-occurrence matrix |
| Tamura | Set of features related to human perception |
| Gabor Based | Gabor filtering of images |
| Power Density Spectrum derived | Space frequency representation of image, |
| Position | Position of structure s with respect to any referential |
| Connexity | Distance s to the closest structure of interest |
| Signed difference Derived | Metrics derived from local image differences |
| Norm of difference Derived | Metrics from absolute value of image differences |
| Number of findings | Number of all findings displayed in an image |
| Number of findings by organ | Number of all findings identified hosted by an organ |
| Number of sites involved | Number of organ hosting lesions |

In an embodiment of the disclosure, a plurality of parameters of the intensity distribution of the detected ROI are extracted. In another embodiment, the density of an organ is assessed. Such assessment may be obtained from the mean intensity across an area of fixed dimension within the organ. In a further embodiment, the relationship between the image intensities and the tissue densities is computed. In a preferred embodiment, textural features are extracted from the Grey Level Co-occurrence Matrix (GLCM) obtained from the previously defined and positioned ROI. Best shift and directions for computing GLCM must be defined.

Figure 25:
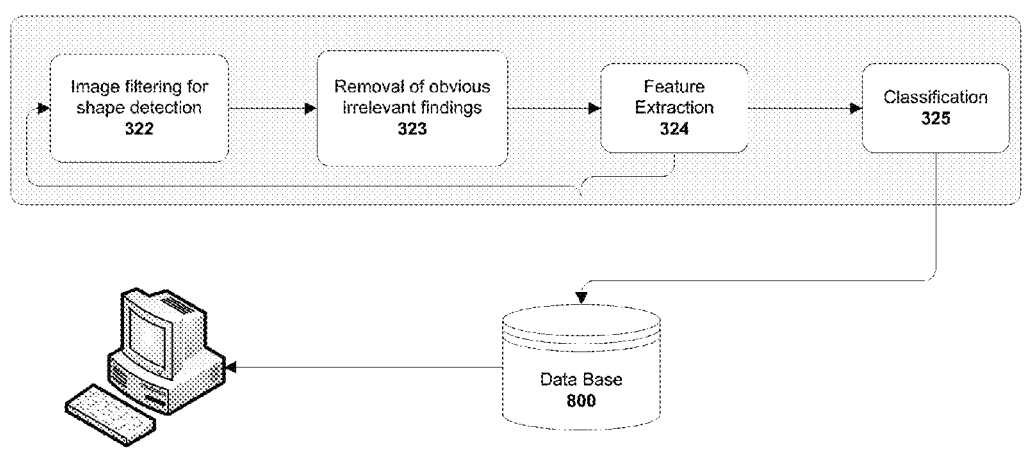
FIG. 25 illustrates another embodiment of texture based feature extraction.

FIG. 25 illustrates the automatic detection of findings and lesions for the present embodiment. In the present comprises Module 322 performing image filtering for shape detection. A preferred embodiment process all the images with enhancing filters based on hessian convolution matrix. Such filtering enhances blob-like structures, line-like structure and plane-like structures. Module 323 process filtered images from Module 322. A preferred embodiment of Module 323 consists in applying thresholds to keep blob-like structures having a significant volume and likely to be included in the lung. In a preferred embodiment Module 324 extract imaging features of ROIs centered on marks displayed by output of Module 323 and composed with image input to Module 322. Module 324 also computes GLCM of given shift and direction and GLCM-derived features as Contrast, Entropy or Energy characterizing lesions. Module 325 is a classification step where a preferred embodiment consists in a SVM classifier purposely trained.

Figure 26:
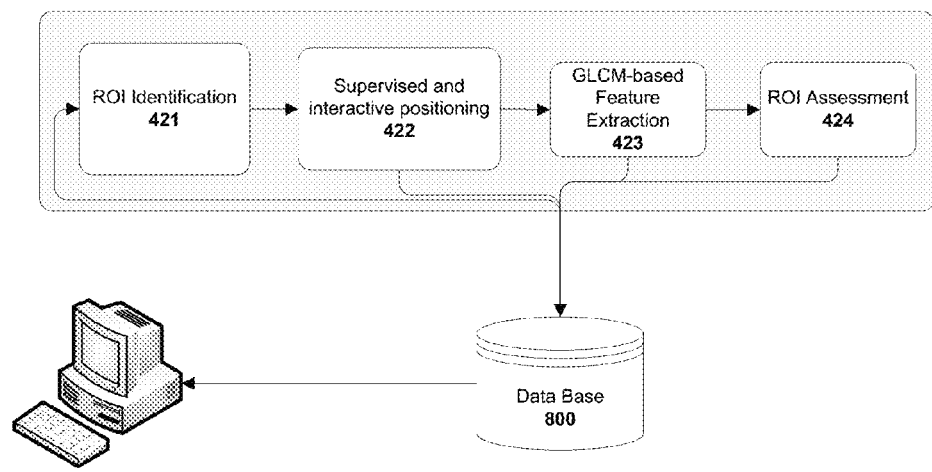
FIG. 26 illustrates another embodiment of texture based lesion characterization.

FIG. 26 illustrates the lesion assessment process for the present embodiment comprising Module 421 that performs lesion selection, Module 422 enabling positioning and adjustment, Module 423 extracting Grey Level Co-occurrence-based imaging features and Module 424 consisting in lesion characterization. In a preferred embodiment Module 421 performs the selection of lesions likely to be best evaluated without segmentations. For instance lesions near confusing structure would not be part of the assessment. In another embodiment Module 421 is similar to Module 420. Module 422 performs lesion positioning. In a preferred embodiment, an ROI of predefined dimension is positioned manually overlapping the lesion with ROI center aligned on center of mass of the lesion. In another embodiment, a 3D coordinate point is set over the center of mass of the lesion. In still another embodiment, a bounding box is manually adjusted to match the lesions geometry. Module 423 processing feature extractions based on GLCM-derived computing such as listed in Table 2. In a preferred embodiment, features such as Entropy, Energy or Contrast are extracted. Module 424 performs lesion characterization. In a preferred embodiment, this module comprises classifying lesions according to criteria such as malignancy. In such embodiment, malignancy of lesions can be characterized according the texture and density of lesions tissue. A limit value derived from texture of tissue can help to classify between benign and malignant tissue. Another preferred embodiment, lesions are classified according to a measurability criteria. In such embodiment, sample of analyzed tissue can be classified as unsuitable for monitoring when featuring mixed structures as cavitations, calcifications, crossed by vessels.

Cross Modality Biomarkers

In order to improve lesion tracking, an additional image from another modality is used to add information thus improving lesion characterization and monitoring. In a preferred embodiment using consecutive acquisitions of PET and CT images, the PET image is used to select active lesions as it has been demonstrated that active lesion have higher glucose avidity. In a preferred embodiment, we use PET as one imaging and CT, or MRI, as the other imaging modality. Example 3 use to mention CT imaging but we consider that MRI can be used instead. Corresponding ROI in the CT image confirmed the existence of the lesion and provide anatomical reference. Centering the ROI according to the brightest area of the lesion as displayed on the PET scan will allow improve the accuracy and the effectiveness of lesion tracking In another preferred embodiment, a CT image is used to register the anatomy and the change in PET signal is computed. The lesions are characterized based on images acquired at different times. Again, no segmentation is performed. Such embodiment requires different steps of registration prior to subtracting the corresponding ROIs.

Figure 27:
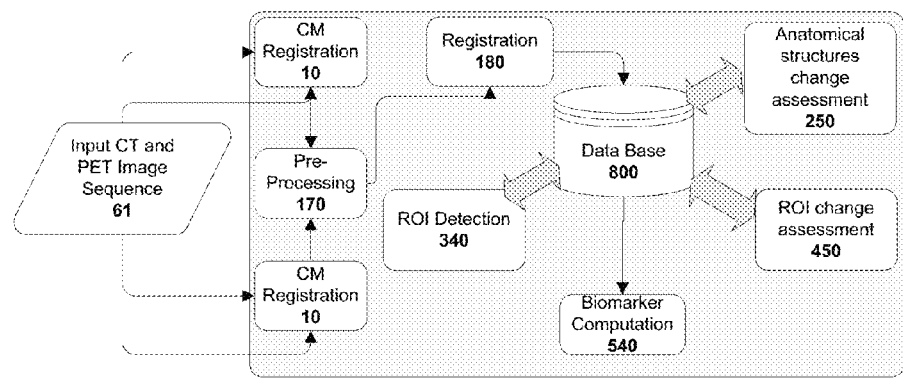
FIG. 27 illustrates another embodiment of biomarker relying on inter-modality co-occurrence matrix computation.

FIG. 27 illustrates a third embodiment of the process. Module 61 inputs a chronologic sequence of cross modality images of the same patients. In a preferred embodiment pairs of CT and PET images are input. Each of pair of CT and PET images are Cross Modality registered by Module 10. A preferred embodiment for this step of registration is Optimization of Mutual Information that does not need prior segmentation. Module 180 performs a global registration between the two couple of image space. This module encompass a resampling to the same sampling rate. Here again a preferred embodiment relies on Optimization of Mutual Information. (Pluim, 2003).

In a preferred embodiment, the process comprises the steps of: identifying at least one common ROI in each image of the first image sequence based on features extracted in the second image sequence; performing a registration of the common ROIs in the first sequence; computing a gray-level co-occurrence matrix for each voxel of the common ROIs in the temporal sequence of the first modality; extracting a texture based feature vector from the co-occurrence matrix for each voxel the common ROIs; computing the distance between the texture-based feature vectors across the common ROIs in the temporal sequence of the first modality.

Figure 28:
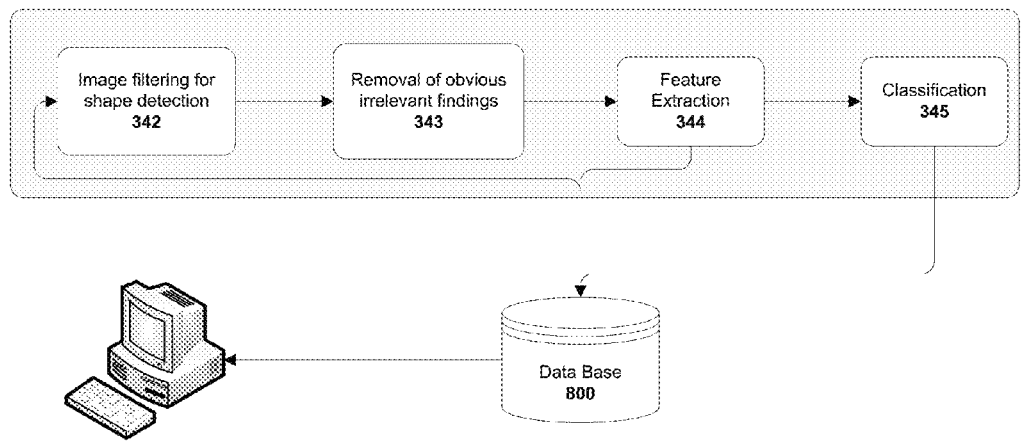
FIG. 28 illustrates a embodiment of automatic lesion detection based on inter-modal texture analysis.

FIG. 28 illustrates an embodiment of automatic lesion detection based on Multimodal image analysis. Input data are two images from different modalities. First step of automatic lesion detection is Module 342 that module processes shape detection as enhanced filtering across a preferred modality for detection. CT image is preferred. Blob-like structures are enhanced, line-like structures are enhanced and plane-like structures are enhanced. Next step is Module 343 where irrelevant findings are removed. At that step the three enhanced filters are thresholded in order to binarize enhanced filters. Line-like and plane-like binarized images are masking blob-like binarized image keeping visible and outputting only blobs binarized masked image. Next Module 344, computes a plurality of imaging features, as listed Table 2. First order feature are compute separately each of the PET or CT or MRI image. Second order feature compute inter PET and CT or MRI GLCM co-occurrence matrix then extract Haralick features such as Entropy, Contract or Energy. Then from the two modality-derived features or the inter-modality-derived feature are passed to Module 345 to perform a classification according to a pre-trained phase. Output of Module 345 is a binary status about disappeared lesions and new lesions appeared between the two examinations.

Figure 29:
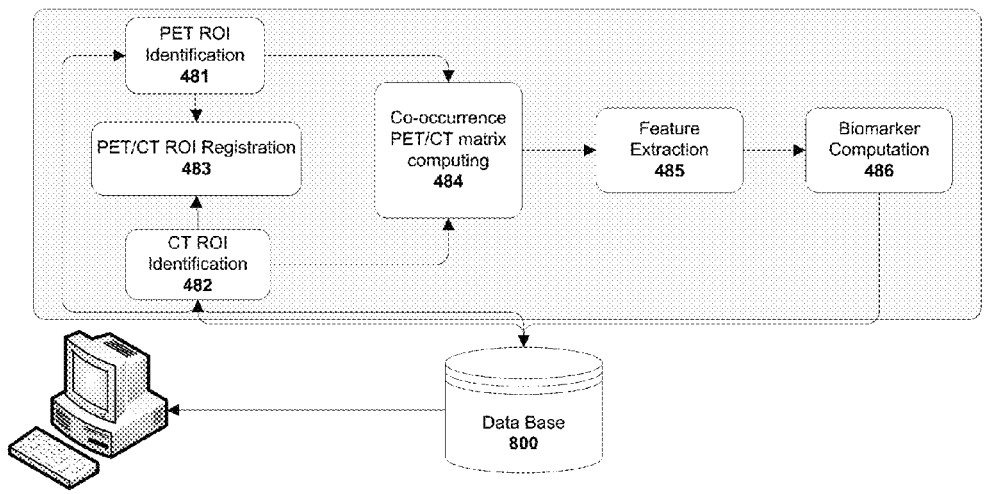
FIG. 29 illustrates an embodiment of a biomarker evaluation based on multi-modality images at each time point.
Figure 30:
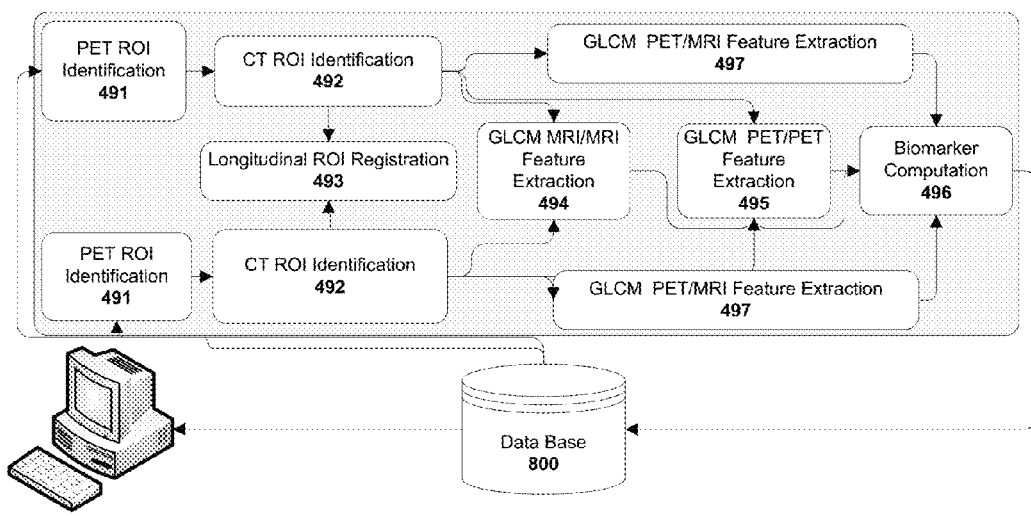
FIG. 30 illustrates an embodiment of a biomarker evaluation based on multi-modality images between time points.

FIG. 29 and FIG. 30 illustrate two embodiments of the biomarker evaluation process for change assessment. In a first embodiment, Module 481 and 482 process PET and corresponding CT images acquired simultaneously and perform the identification of findings. Module 483 resamples the image into the same geometry and then registers the PET and CT ROIs. In a preferred embodiment the registration is performed using an Optimization of Mutual Information method. In the first embodiment illustrated in FIG. 29, a cross-modality PET-CT GLCM is computed by Module 484.

Module 485 subsequently extracts textural features from the cross-modality GLCM. The last step of this embodiment as Module 486, predicts response to treatment. In another embodiment as illustrated in FIG. 30, Module 493 applies to PET images the same registration transformation computed on MRI ROIs considering that, at each time point PET and MRI are correctly co-registered. Image are pre-processed then resamples the PET and MRI images to match the sampling rates and dimensions between the ROIs in order to, finally, compute the co-occurrence matrix and extract a plurality of imaging features. In another preferred embodiment of Module 497, GLCMs are computed from each modality and textural features are extracted from the GLCMs. These two GLCMs input scans from different modality but from same time point as GLCM_PET_MRI. One GLCM_PET_MRI is computed at all successive time point. Module 494 compute GLCM input a first ROI of a MRI scan at an early time point and a second ROI of another MRI scan from a later time point as GLCM_MRI. Module 495, compute another GLCM that input a first ROI of a PET scan at an early time point and a second ROI of another PET scan from a later time point as GLCM_PET. GLCM_PET is the basis to detect change in the PET texture for a given ROI. In a preferred embodiment texture features including Entropy, Contrast, Correlation, Homogeneity and Energy are extracted from the GLCM. Module 498 applies a classification step, using SVM, in order to assess response to treatment.

EXAMPLES

Example 1

Biomarker of Change in Ischemic Burden

Description

Myocardial ischemia is a restriction in blood supply to heart tissues, causing a shortage of oxygen and reduced cardiac capacity. Ischemia is generally caused by occlusions in the major arteries, resulting in reduced perfusion to the heart and damage to the heart muscle. The preferred imaging modality for assessing ischemia is ECG Gated SPECT or PET where acquisition is synchronized to the heart rate and images are acquired throughout the cardiac cycle. A first sequence of images is acquired at rest and a second series is acquired after pharmacologic stress or exercise. The proposed biomarker provides a quantitative measure of the ischemic burden from the comparison between rest and stress images.

Method

The patient is injected intravenously with a first dose of a radio-isotope and a first sequence of ECG Gated resting PET/SPECT images is acquired. The patient is then injected with a pharmacologic stressor agent such as dipyridamole followed by a second injection of the radio-isotope and a second sequence of ECG Gated stress PET/SPECT images is acquired. First, the heart is automatically located in each of the two image sequences (Stress image sequence and rest images sequence). A 3D non-rigid registration process then registers the stress and rest cardiac images to a 3D reference model.

Statistical Analysis

In a second step, the sum of the rest images is computed by summing on a voxel by voxel basis the N registered images of the rest sequence as the IntgRest, then the sum of the stress images is computed by summing on a voxel by voxel basis the N registered images of the stress sequence as the IntgStress image. From these two sum images, a first difference image as Diff_SR is obtained by subtracting the intensities of IntgRest from the IntgStress images on a voxel by voxel basis.

$$\text{Diff\_SR}(x, y, z) = \sum_N (IntgStress(x, y, z) - IntgRest(x, y, z))$$

Same image of difference is computed from a normal population as Diff_SR_N:

$$\text{Diff\_SR\_N}(x, y, z) = \sum_N (IntgStressN(x, y, z) - IntgRestN(x, y, z))$$

The Distribution of Diff_SR_N reference difference image is evaluated, identifying the average Diff_SR_N value and Standard Deviation (SD_N). In a preferred embodiment, the average value of Diff_SR difference image is compared to a threshold of two Standard Deviations SD_N of the reference difference image. A second difference, as Diff_Stress, image sequence is obtained by subtracting the N integrated intensities of a normal population stress image, IntgStressN, from the integrated stress images obtained in summing N images from stress sequence.

$$\text{Diff\_Stress}(x, y, z) = \sum_N (IntgStress(x, y, z) - IntgStressN(x, y, z))$$

A test of the deviations of the stress image from a normal population is applied to the second Diff_Stress difference image. In a third step, a quantitative imaging biomarker (QIB) of the ischemic burden is compute based on the EnergySR of the stress-rest difference image and the EnergyS of the stress normal difference image.

$$EnergySR = \sum_{Dimx, Dimy, Dimz} \text{Diff\_SR}(x, y, z)$$

$$EnergyS = \sum_{Dimx, Dimy, Dimz} \text{Diff\_Stress}(x, y, z)$$

Example 2

Biomarker of Change in Lung Lesion Mass

Description

The embodiment comprises a segmentation-free assessment of the change in lesion mass computed from Computed Tomography images of the lungs. A temporal sequence of CT scans of the chest region of the patient is acquired at baseline and at subsequent time points.

Method

Figure 22:
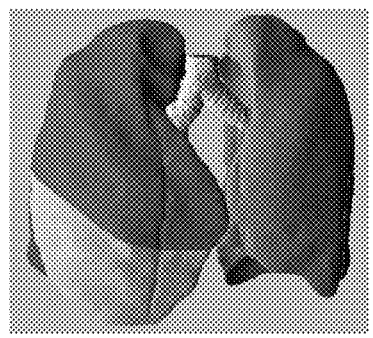
FIG. 22 illustrates atlas based registration of lungs.

In a first step of a preferred embodiment of the method, the subsequent image acquisitions are registered to the baseline acquisition, using an Optimization of Mutual Information algorithm (Pluim, 2003). In a second step, the lungs are detected in each of the images and registered to a lung atlas as illustrated in FIG. 22 using the optimization of Mutual information algorithm. In a third step, lesions are automatically detected in the lung area. In a preferred embodiment, lesions are detected using enhanced filtering along with mathematical morphology and segmentation-free feature extraction provided to a classifier such as SVM. Next, pairing of suspected ROIs is carried out relying on a geometric distance criteria such as quadratic distance.

Statistical Analysis

Next step is the alignment of respectively each targeted ROIs and the local voxel wise subtraction of the ROI. For each targeted finding the change in the mass of the lesion is computed according to the formula:

$$\Delta_{Mass} = \alpha \times Vox \times \sum_{ROI} I_2(x, y, z) - I_1(x, y, z)$$

Where $\alpha$ is the linear relationship assumed between image intensity and tissue density, Vox is the unitary volume of a voxel, $I_1$ represent the intensity of a voxel in $ROI_1$ in Image1 of the sequence and $I_2$ represent the intensity of a voxel in $ROI_2$ in Image2 of the sequence. In a preferred embodiment, the change in the mass of a lesion evaluated according to the above formula is a quantitative imaging biomarker (QIB) of disease progression free from the variability inherent to the segmentation process. In another preferred embodiment, a QIB of disease progression is based on the relative change in mass of the ROI computed taking into account the non-linear relationship f(I) between image intensity and tissue density as:

$$\Delta_{Relative-Mass} = \frac{\sum_{ROI} f(I_2(x, y, z)) - f(I_1(x, y, z))}{\sum_{ROI} f(I_2(x, y, z))}$$

In that last embodiment, the QIB is expressed as a % change.

Example 3

Biomarker of Relative Change in Tumor to Liver Textures

Description

It is known that the shape, position and size of the liver changes daily. When the liver grows or shrinks, the density of the hepatic tissue changes proportionally, thus intensity of lesions within the liver may change without any change in pathology. When lesion intensity (or density) is considered part of a biomarker, it is important to normalize liver tissue intensity (or density) to take into account such variation. Second order textural features may be more informative then first order features such as maximum or average density. Similarly to first order features such as tissue density, textural features will vary with liver size and shape.

Method

In one embodiment of the method, a CT image is acquired at a first time point $t_1$. Two distinct ROIs are then selected from different regions of the same image: one diseased hepatic ROI (dROI) and one non-diseased hepatic ROI (ndROI). A Grey Level Co-occurrence Matrices (GLCM) is then generated for each selected ROI. In a preferred embodiment, textural features such as entropy, energy, contrast, homogeneity and correlation are extracted from each GLCM. At each successive time point, $t_2, t_3, \ldots t_n$, a new CT image is acquired and the dROI and ndROI identified and registered to the original dROI and ndROI by non-rigid registration. Next, new GLCMs are generated for the registered dROI and ndROI. Textural features are then extracted for the registered dROI and ndROI at each time point. In one embodiment, a quantitative imaging (QIB) biomarker of disease progression is based on the change of values of textural features extracted from the GLCMs at each successive time point, $t_2, t_3, \ldots t_n$.

Statistical Analysis

In another preferred embodiment, a quantitative imaging biomarker (QIB) of disease progression is based on the change in values of textural features extracted from two GLCMs computed with ROIs that have been shifted along a fixed direction. In that embodiment, two shifted dROI are used to generate one Diseased_GLCM and two shifted ndROIs are used to generate one NonDiseased_GLCM. Textural features are extracted from the Diseased_GLCM and NonDiseased_GLCM and monitored over time for response assessment. In still another embodiment of the method applied to liver lesions, MR images are used. In another embodiment, a quantitative imaging biomarker (QIB) of disease progression is computed based on the distance between consecutive GLCMs using the Earth Movers Distance (EMD) (Stolfi, 1994). In still another embodiment, a QIB of disease progression is computed based on the distance between consecutive GLCMs using the Divergence of Kullback-Leibler (Kullback, 1959) extended to bivariate distributions. The monitoring of the distance between co-occurrence matrices applies between Diseased_GLCM at consecutive time points. In still another embodiment, a QIB of disease progression is based on the distance between consecutive Diseased_GLCM normalized by the distance of consecutive NonDiseased_GLCM. In another embodiment, a QIB of disease progression involves extracting a vector of GLCM-derived textural features at consecutive time points, featVect$_t$, then computing the distance between these vectors. The components of featVect$_t$ are selected from the list consisting of Energy, Contrast, Correlation Sum of Square Variance, Homogeneity, Sum Average, Sum Variance, Sum Entropy, Entropy, Difference Variance, Difference Entropy, Info Measure of Correlation, Info Measure of Correlation, Maximal Correlation Coefficient. The distance between consecutive fVect$_t$ is then evaluated based on the Manhattan distance, the Euclidian distance or Chebyshev distance:

$$ManhDist = \sum_{i=1}^{h} |Feat_t^i - Feat_{t+1}^i|$$

$$EuclDist = \sqrt{\sum_{i=1}^{h} (Feat_t^i - Feat_{t+1}^i)^2}$$

$$ChebyDist = \max_{i \in [1,h]} (|Feat_t^i - Feat_{t+1}^i|)$$

A response is detected if the distance exceeds a specified threshold. In still another embodiment, the QIB is obtained by considering the textural features separately and feeding a classification system involving artificial intelligence.

Example 4

Biomarker of Ischemic Burden

Description

Ischemia is a restriction in blood supply to heart tissues, causing a shortage of oxygen and glucose needed for cellular metabolism (to keep tissue alive). Ischemia is generally caused by occlusions in blood vessels, with resultant damage to or dysfunction of tissue. In that embodiment preferred imaging is Gated SPECT or PET where image are synchronized with heart phases classifying between at rest images or stress images.

Method

In a preferred embodiment, co-occurrence matrices GLCM_Stress_Normal of the heart stress sequence of N images from a Normal population are computed for four distances with 1, 2, 4, and 8 voxels respectively and thirteen directions, to produce 52 (4×13) displacement vectors and thereafter 52 co-occurrence matrices. In addition, GLCM-derived feature are computed from stress and rest sequence of N images from a Normal population as GLCM_StressRest_Normal. In a preferred embodiment, the heart position is automatically located and used to center the target ROIs in the rest and stress image. The positioning of the ROIs can be manually adjusted or registered against an atlas. The sum of the rest images is computed by summing the N images of the rest sequence as IntgRest then, the sum of the stress image is computed by summing the N images of the stress sequence as IntgStress images. From these two sum images, two co-occurrence matrices are computed. The first GLCM, as GLCM_Stress, input two ROIs from IntgStress where the second ROI correspond to the first ROI shifted of a predefined value along a predefined direction. The second GLCM, as GLCM_StressRest, input two different ROIs of the same anatomic area, one from IntgStress and one other ROI from IntgRest. The distribution of the tested GLCM_Stress, is then compared to the distribution of the GLCM_Stress_Normal. A significant difference between the two distributions indicates hypoperfusion. Similarly, the distribution of GLCM_StressRest is compared to the GLCM_StressRest_Normal distribution. A significant difference is indicative of ischemia.

Statistics

In a preferred embodiment, texture features derived from the target GLCMs is compared against the GLCM computed on Normal populations. In a preferred embodiment, the distance between GLCM_Stress and GLCM_Stress_Normal and the distance between GLCM_StressRest_Normal and GLCM_StressRest are computed. In a preferred embodiment, Earth Mover Distance (EMD) (Stolfi 1994) is a preferred embodiment for detecting difference. In another preferred embodiment, embodiment for measuring difference relies on the Divergence of Kullback-leibler (Kullback, 1959) extended to bivariate distributions. In another preferred embodiment, a vector of GLCM-derived features is computed for the target sequence and for Normal sequence, as featVect, then to monitor the distance between the vectors. In another embodiment, a QIB of response involves extracting a vector of GLCM-derived textural features, $featVect_t$, from each of the IntgRest sum image and the IntgStress sum image and computing the distance between these two vectors. The components of $featVect_t$ are selected from the list consisting of Angular Second Moment, Contrast, Correlation Sum of Square Variance, Inverse Different Moment, Sum Average, Sum Variance, Sum Entropy, Entropy, Difference Variance, Difference Entropy, Info Measure of Correlation_1, Info Measure of Correlation_2, Maximal Correlation Coefficient. The distance between consecutive $fVect_t$ is then evaluated based on the Manhattan distance, the Euclidian distance or the Chebyshev distance. A response is detected if the distance exceeds a specified threshold. In still another embodiment, the QIB is obtained by considering the textural features separately and feeding a classification system.

Example 5

Predictive Biomarker for Pulmonary Lesions

Description

Figure 31:
FIG. 31 illustrates a registration between a PET and a CT image.

There is often a need to predict whether a patient is likely to respond to a proposed therapy. In one embodiment, a multimodality, texture-based biomarker is used to predict response to drug therapy. For pulmonary lesions, the preferred modalities are PET and CT imaging where image are acquired in a single procedure. The registration between a PET and CT images is illustrated in FIG. 31. In a preferred embodiment, ROIs are selected based on anatomic information from the CT and "hot" areas from the PET images.

Method

In one embodiment, the co-occurrence matrices (Grey Level Co-occurrence Matrix GLCM) derived from the cross-modality intra-patient PET/CT ROI images of a reference population are first computed. Such reference population is used as comparator. Next, two images, one CT image and one PET image, are acquired simultaneously at baseline before treatment. The acquired images are pre-processed specifically to have same sampling rate then registered to each other. Next, the inter-modality GLCM (Grey Level Co-occurrence Matrix) is computed.

Statistical Analysis

In one embodiment, the patient GLCM is compared against the GLCM Normal computed from the reference population. In a preferred embodiment, a quantitative imaging biomarker of response to therapy is based on the distance between GLCM and GLCM Normal. In one embodiment, the Earth Mover Distance (EMD) (Stolfi, 1994) is used to compute the distance. A distance greater than a specified threshold is indicative of response. In another embodiment the distance is computed based on the Divergence of Kullback-leibler (Kullback, 1959) extended to bivariate distributions.

In another embodiment, a QIB of disease progression involves extracting a vector of GLCM-derived textural features at consecutive time points, $featVect_t$, then computing the distance between these vectors. The components of $featVect_t$ are selected from the list consisting of Angular Second Moment, Contrast, Correlation, Sum of Square Variance, Inverse Different Moment, Sum Average, Sum Variance, Sum Entropy, Entropy, Difference Variance, Difference Entropy, Info Measure of Correlation_1, Info Measure of Correlation_2, Maximal Correlation Coefficient. The distance between consecutive $fVect_t$ is then evaluated based on the Manhattan distance, the Euclidian distance or Chebyshev distance. A response is detected if the distance exceeds a specified threshold. In still another embodiment, the QIB is obtained by considering the textural features separately and feeding a classification system.

Example 6

Biomarker of Change in Tumoral Burden in the Liver Using PET

Description

Figure 32:
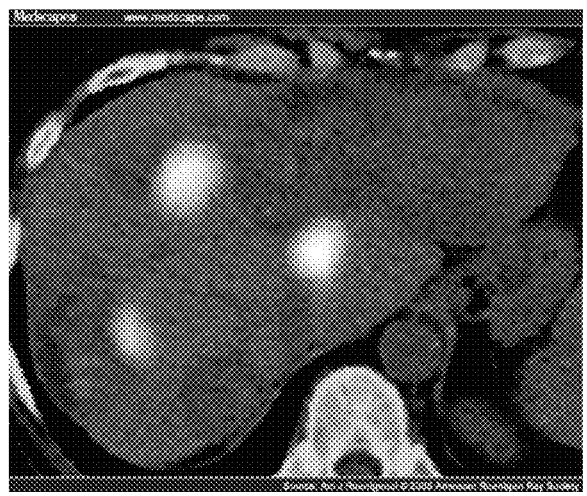
FIG. 32 illustrates active lesions identified with PET imaging

Modalities such as CT and MRI have limitations in the detection of malignant hepatic lesions. Malignant lesions have an "active" component which is best identified with PET imaging as illustrated in FIG. 32. In a preferred embodiment, a temporal sequence of co-registered PET/MRI images is acquired from the same patient at two different times.

Method

The first step of the processing comprises registering all four scans (the two MRIs and the two PETs acquired at two different times). In a preferred embodiment, the images are registered using Optimization of Mutual Information (Pluim, 2003). In a second step, the liver is automatically located in the two MRI scans of the sequence. Next, liver ROIs of predefined dimensions are positioned based on "active" areas in the PET images indicative of increased glucose uptake. The corresponding ROIs in the registered MR images are also identified. In a preferred embodiment, a first GLCM is computed from the two MRI ROIs acquired at the two consecutive time points (GLCM_MRI), a second GLCM is computed from the two corresponding PET ROIs acquired at the two consecutive time points (GLCM_PET) and two additional GLCMs are computed from the corresponding PET and MRI ROIs (GLCM_PET_MRI), one for each of the two consecutive time points.

Statistical Analysis

In a preferred embodiment, the quantitative imaging biomarker (QIB) of disease progression is based on the distance between the feature signatures GLCMs of same nature computed at consecutive time points. In a preferred embodiment, the distance the features signatures computed from consecutive GLCMs is based on the Earth Mover Distance (EMD) (Stolfi 1994). In a preferred embodiment, a QIB is indicative of response if the EMD exceeds a specified threshold. In another embodiment, the distance is computed based on the Divergence of Kullback-leibler (Kullback, 1959) extended to bivariate distributions.

In another embodiment, a QIB of disease progression includes extracting a plurality of vectors at consecutive time points, consisting of GLCM-derived texture-based features, featVect$_t$, then computing the distance between these vectors. The components of featVect$_t$ are selected from the list consisting of Angular Second Moment, Contrast, Correlation Sum of Square Variance, Inverse Different Moment, Sum Average, Sum Variance, Sum Entropy, Entropy, Difference Variance, Difference Entropy, Info Measure of Correlation_1, Info Measure of Correlation_2, Maximal Correlation Coefficient. The distance between consecutive fVect$_t$ is then evaluated based on the Manhattan distance, the Euclidian distance or Chebyshev distance. Response is detected if the distance exceeds a specified threshold. In still another embodiment, the QIB is obtained by considering the texture-based features separately and feeding a classification system.

The invention claimed is:

1. An image processing apparatus for computing a quantitative imaging biomarker (QIB) of disease severity from variations in texture-based features in a tomographic image, the apparatus comprising:
    a first module for preprocessing by normalizing the intensities in the tomographic image;
    a second module for identifying at least one organ of interest in the tomographic image;
    a third module for identifying and selecting a plurality of target region of interest (ROIs) and reference ROIs representative respectively of abnormal and normal pathology in the organ(s) of interest;
    a fourth module for extracting a plurality of texture-based feature signatures from the target ROIs and the reference ROIs, wherein the feature signatures are generated from distributions of statistical attributes extracted from each ROI;
    a fifth module for computing the distance between the target ROI signatures and the reference ROI signatures, wherein the QIB quantitative imaging biomarker is a function of the distance between the target ROI signatures and the reference ROI signatures wherein the distance is computed using the Earth Movers Distance or the Divergence of Kullback-Leibler.

2. The apparatus of claim 1 wherein the tomographic images are selected from the group consisting of computer tomography, magnetic resonance imaging, single photon computed emission tomography and positron emission tomography.

3. The apparatus of claim 1 wherein the statistical attributes are second order statistical attributes extracted from a co-occurrence matrix and selected from the group consisting of Energy, Contrast, Correlation, Sum of Square Variance, Homogeneity, Sum Average, Sum Variance, Sum Entropy, Entropy, Difference Variance, Difference Entropy, Info Measure of Correlation, Maximal Correlation Coefficient.

4. An image processing apparatus for computing a quantitative imaging biomarker (QIB) of disease progression from a temporal tomographic image sequence, the apparatus comprising:
    a first module for identifying at least one common region of interest ROI in each image of the temporal sequence;
    a second module for performing a voxel by voxel registration of the common ROIs in the image sequence wherein the second module performs the registration using an Optimization of Mutual Information algorithm;
    a third module for computing a feature vector for each voxel of the common ROIs wherein the feature vector comprises a plurality of texture-based feature values extracted from the common ROIs;
    a fourth module for computing a difference feature vector for each voxel of the common ROIs wherein the difference feature vector comprises a plurality of differences of the texture-based feature values between successive images of the temporal image sequence;
    a fifth module for computing from the distance between feature vectors of all voxels in the common ROIs, wherein the QIB quantitative imaging biomarker is a function of the distance between the feature vectors.

5. The apparatus of claim 4 wherein the distance is selected from the group consisting of the Manhattan distance, the Euclidian distance, the Chebyshev distance.

6. The apparatus of claim 4 wherein the texture-based features comprise second-order statistical attributes extracted from a co-occurrence matrix and selected from the group consisting of Energy, Contrast, Correlation, Variance, Homogeneity, Sum Average, Sum Variance, Sum Entropy, Entropy, Difference Variance, Difference Entropy, Info Measure of Correlation, Maximal Correlation Coefficient.

7. The apparatus of claim 4 wherein the distance between feature vectors is selected from the group consisting of the Manhattan distance, the Euclidian distance, the Chebyshev distance.

8. An image processing apparatus for computing a quantitative imaging biomarker (QIB) of disease progression from a first temporal tomographic image sequence of a first modality co-registered with a second temporal tomographic image sequence of a second modality, the apparatus comprising:
    a first module for identifying at least one common region of interest ROI in each image of the first image sequence based on features extracted in the second image sequence;
    a second module for performing a registration of the common ROIs in the first sequence wherein the second module performs the registration using an Optimization of Mutual Information algorithm;
    a third module for computing a gray-level co-occurrence matrix for each voxel of the common ROIs in the temporal sequence of the first modality;
    a fourth module for extracting a texture based feature vector from the co-occurrence matrix for each voxel the common ROIs;
    a fifth module for computing the distance between the texture-based feature vectors across the common ROIs in the temporal sequence of the first modality.

9. The apparatus of claim 8 wherein the first modality is CT and the second modality is PET.

10. The method of claim 9 wherein selecting at least one region of interest (ROI) in the first image of the temporal sequence of tomographic images, wherein the peak standardized uptake value lean (SUL) in the corresponding ROI in the first PET image is greater than a specified threshold.

11. The apparatus of claim 9 wherein the distance is selected from the group consisting of the Manhattan distance, the Euclidian distance or the Chebyshev distance.

12. The apparatus of claim 9 further comprising a sixth module to compute an inter-modality co-occurrence matrix for each common ROI in the temporal sequence and a seventh module to compute the distance between the inter-modality co-occurrence matrices of the common ROIs of successive images in the temporal sequence.

13. The apparatus of claim 12 wherein the distance is selected from the group consisting of the Earth Mover's distance, the Divergence of Kullback-Leibler.

14. The apparatus of claim 8 wherein the second module performs the registration using an Optimization of Mutual Information algorithm.

15. The apparatus of claim 8 wherein the texture-based features comprise second-order statistical attributes extracted from a co-occurrence matrix and selected from the group consisting of Energy, Contrast, Correlation, Variance, Homogeneity, Sum Average, Sum Variance, Sum Entropy, Entropy, Difference Variance, Difference Entropy, Info Measure of Correlation, Maximal Correlation Coefficient.

\* \* \* \* \*